(12) United States Patent
Maruyama et al.

(10) Patent No.: US 10,877,454 B2
(45) Date of Patent: Dec. 29, 2020

(54) COMMUNICATION METHOD, CENTRAL CONTROL DEVICE AND INDIVIDUAL CONTROL DEVICE

(71) Applicant: HITACHI, LTD., Tokyo (JP)

(72) Inventors: Tatsuya Maruyama, Tokyo (JP); Yasushi Tomita, Tokyo (JP); Yasuo Sato, Tokyo (JP); Yoshihiro Mizuno, Tokyo (JP); Makoto Aikawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 36 days.

(21) Appl. No.: 16/332,877

(22) PCT Filed: Sep. 22, 2017

(86) PCT No.: PCT/JP2017/034201
§ 371 (c)(1),
(2) Date: Mar. 13, 2019

(87) PCT Pub. No.: WO2018/074136
PCT Pub. Date: Apr. 26, 2018

(65) Prior Publication Data
US 2019/0361419 A1 Nov. 28, 2019

(30) Foreign Application Priority Data
Oct. 19, 2016 (JP) .................. 2016-204818

(51) Int. Cl.
*G05B 19/05* (2006.01)
*H04L 29/08* (2006.01)
(Continued)

(52) U.S. Cl.
CPC ............ *G05B 19/054* (2013.01); *H04L 67/10* (2013.01); *G05B 2219/1204* (2013.01); *G05B 2219/15023* (2013.01)

(58) Field of Classification Search
CPC .. G06F 11/0757; G06F 3/0659; G06F 3/1236; G06F 11/0721; G06F 11/3024;
(Continued)

(56) References Cited

U.S. PATENT DOCUMENTS

| 7,251,686 | B1 | 7/2007 | Tomita | |
|---|---|---|---|---|
| 2005/0114860 | A1* | 5/2005 | Lin | ................ G06F 9/4887 718/100 |
| 2014/0330399 | A1 | 11/2014 | Joko | |
| 2015/0052283 | A1* | 2/2015 | Ishii | ................ G06F 13/4282 710/309 |

FOREIGN PATENT DOCUMENTS

| JP | 05-257852 A | 10/1993 |
|---|---|---|
| JP | 11-88473 A | 3/1999 |

(Continued)

OTHER PUBLICATIONS

Naotaka Fujita, et al. "Electrical Power Assignment Method for Improvement of Hierarchical Supply Control System with Energy on Demand", Multimedian, Distributed, Cooperative, and Mobile Symposium (DICOMO2012), vol. 2012, No. 1, p. 1230-1235.
(Continued)

*Primary Examiner* — Michael J Brown
(74) *Attorney, Agent, or Firm* — Mattingly & Malur, PC

(57) ABSTRACT

The present invention is applied to a distributed control system in which a plurality of control devices (a central control device, an individual control device, and the like) are connected via a network. For example, the central control device executes a start-up deadline determination processing for setting a start-up deadline in consideration of the performance of a device to be controlled, and communication processing for transmitting a packet including identification information of a command and information of the start-up deadline to the individual control device. For example, when receiving the packet transmitted from the central control device, the individual control device controls execution of
(Continued)

the command on the device to be controlled on the basis of the start-up deadline included in the packet.

13 Claims, 16 Drawing Sheets

(51) Int. Cl.
 *G06F 11/30* (2006.01)
 *G06F 9/06* (2006.01)
 *G05B 15/02* (2006.01)

(58) Field of Classification Search
 CPC ........ G06F 11/30; G06F 8/443; G06F 9/4881;
 G05B 15/02; G05B 19/0426; G05B
 2219/1204; G05B 2219/15023; G05B
 2219/25428; G05B 19/054; H04L 67/10
 USPC ........................................ 700/19, 20, 28, 14
 See application file for complete search history.

(56) References Cited

FOREIGN PATENT DOCUMENTS

| | | |
|---|---|---|
| JP | 2000-307639 A | 11/2000 |
| JP | 2005-102060 A | 4/2005 |
| JP | 2005-237163 A | 9/2005 |
| JP | 2014-165883 A | 9/2014 |
| JP | 2016-103965 A | 6/2016 |
| WO | 2013/080983 A1 | 6/2013 |

OTHER PUBLICATIONS

International Search Report of PCT/JP2017/034201 dated Dec. 12, 2017.

Extended European Search Report received in corresponding European Application No. 17862904.4 dated Mar. 16, 2020.

\* cited by examiner

[FIG. 1]
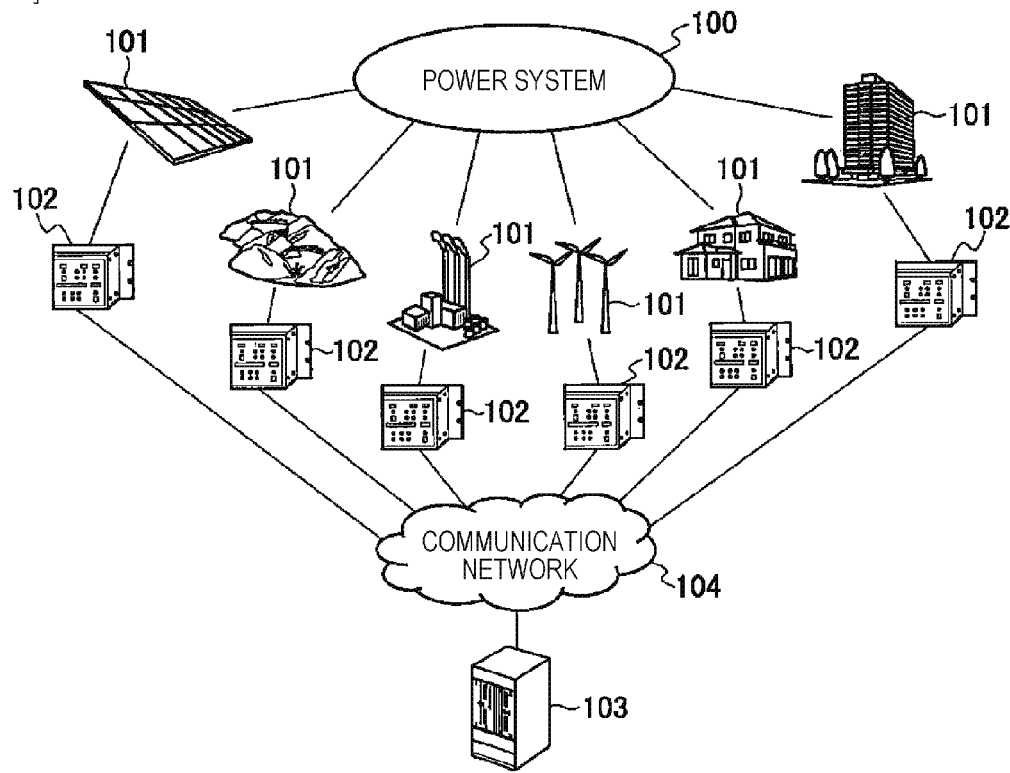
[FIG. 2]
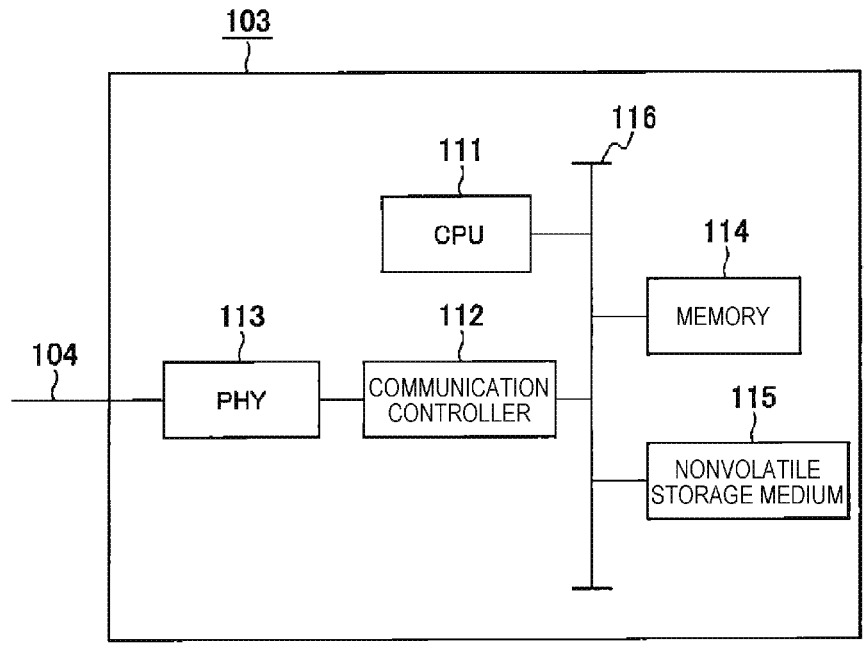

[FIG. 3]
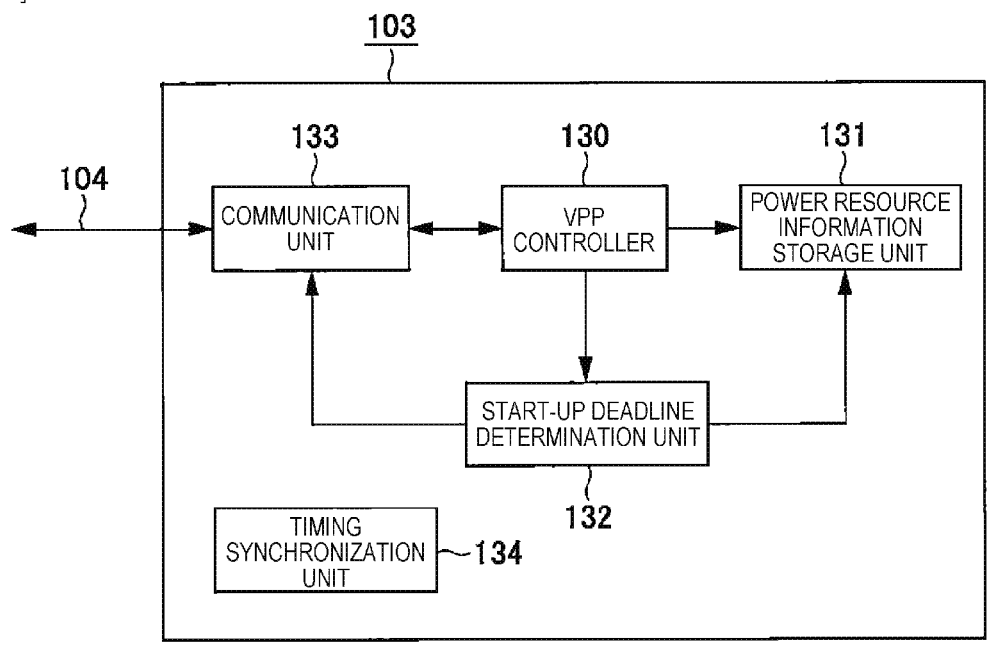
[FIG.4]
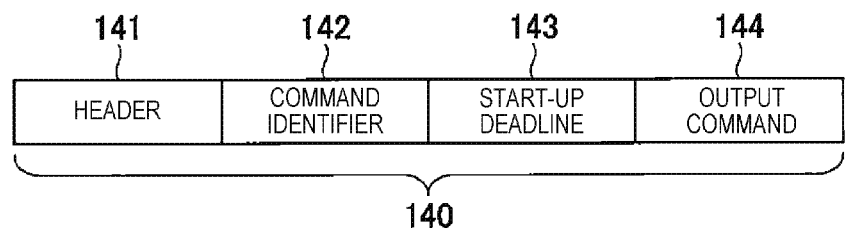

[FIG.5]
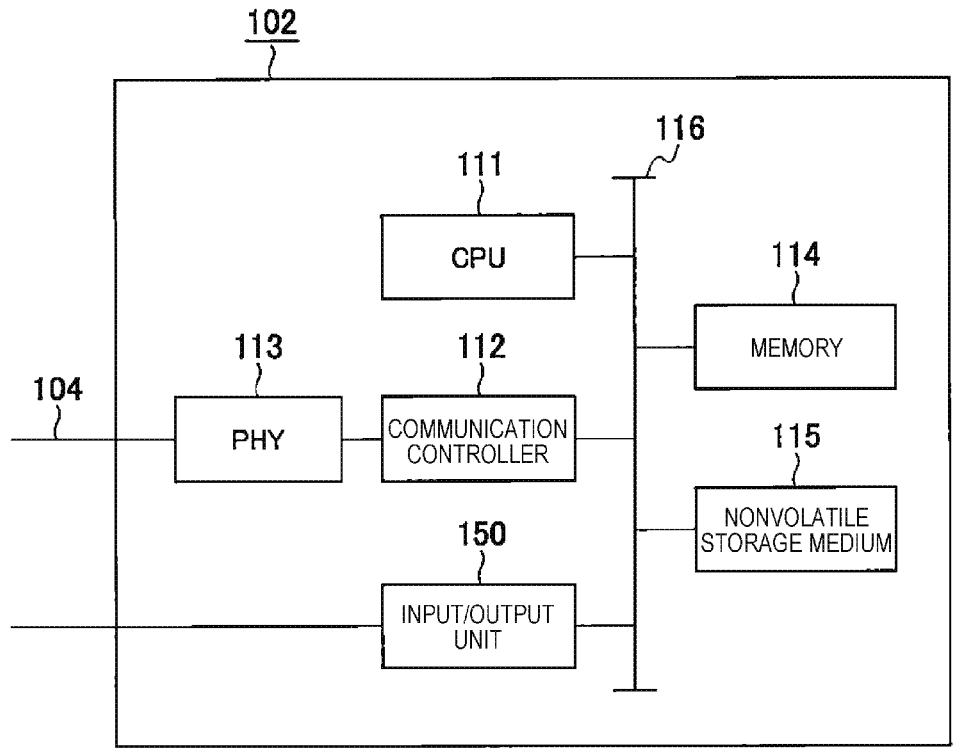
[FIG.6]
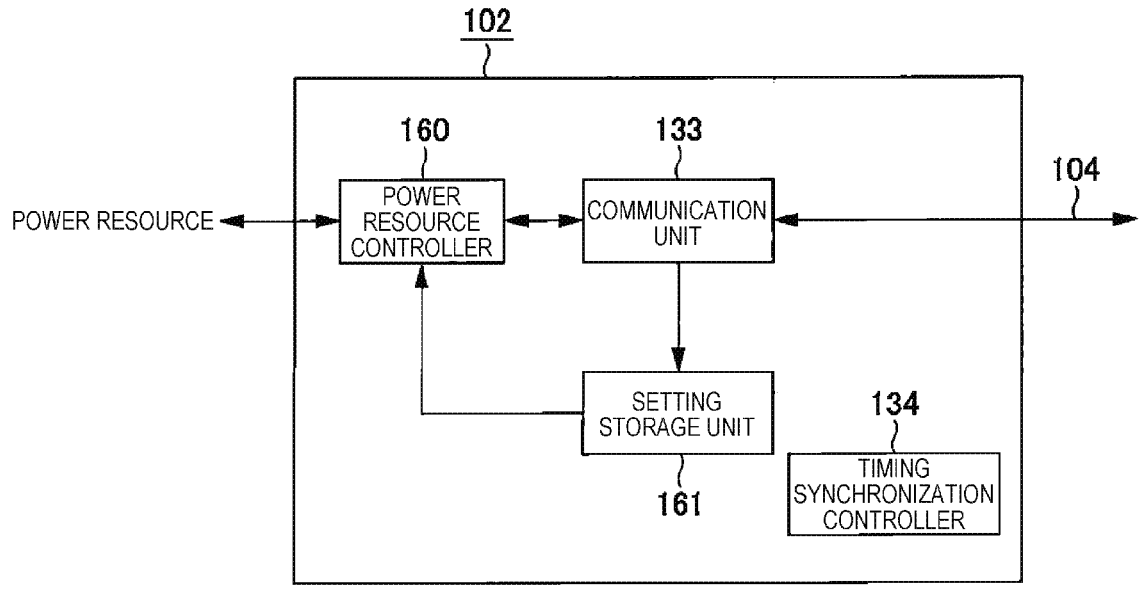

[FIG. 7]
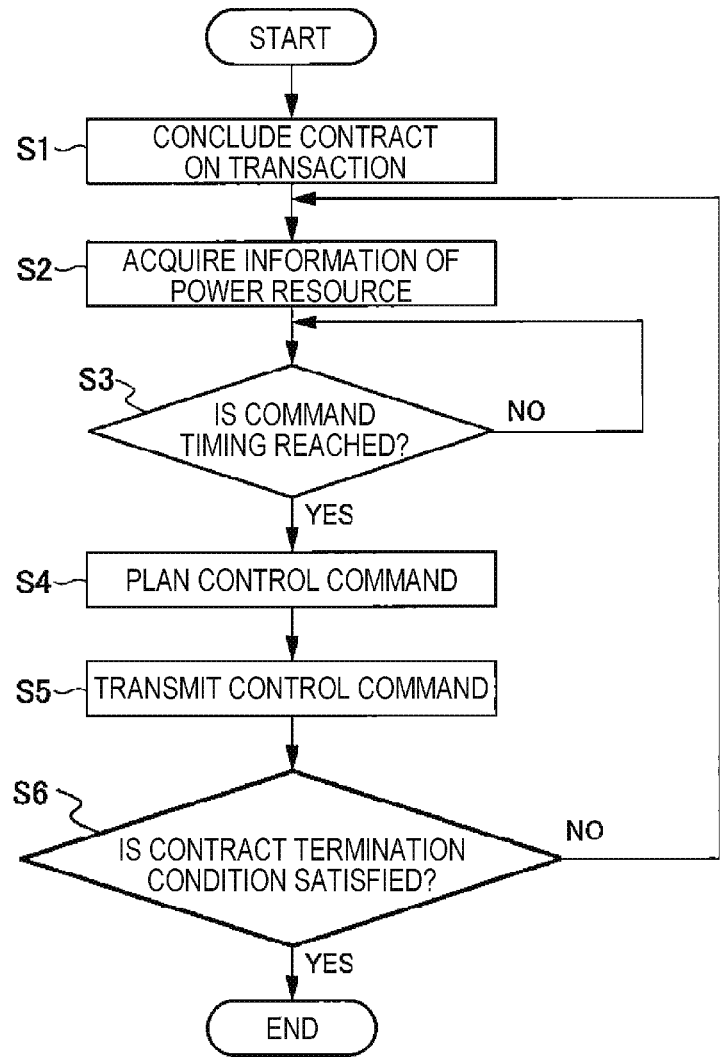

[FIG.8]
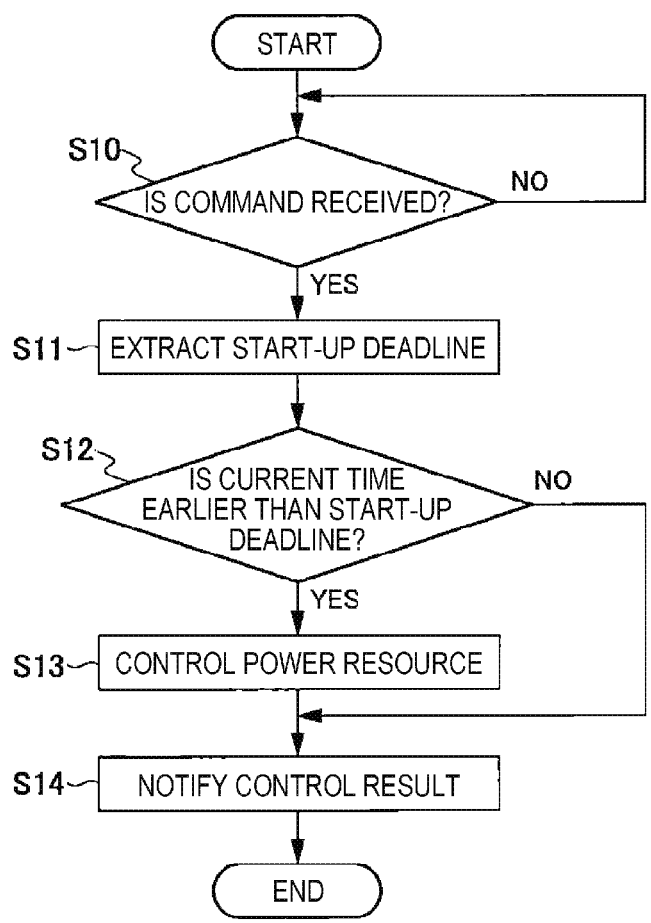

[FIG.9]
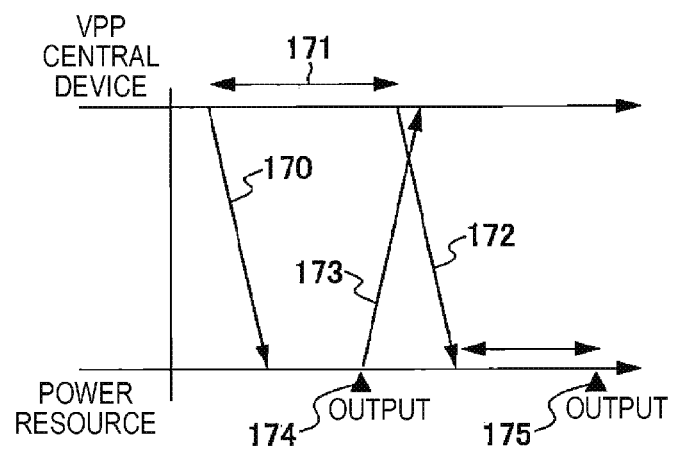
[FIG.10]
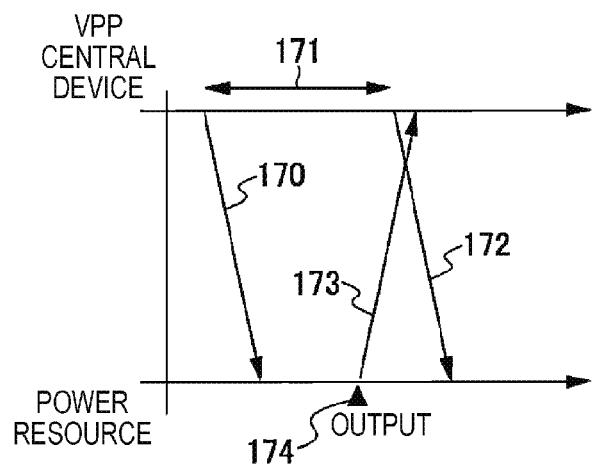

[FIG. 11]
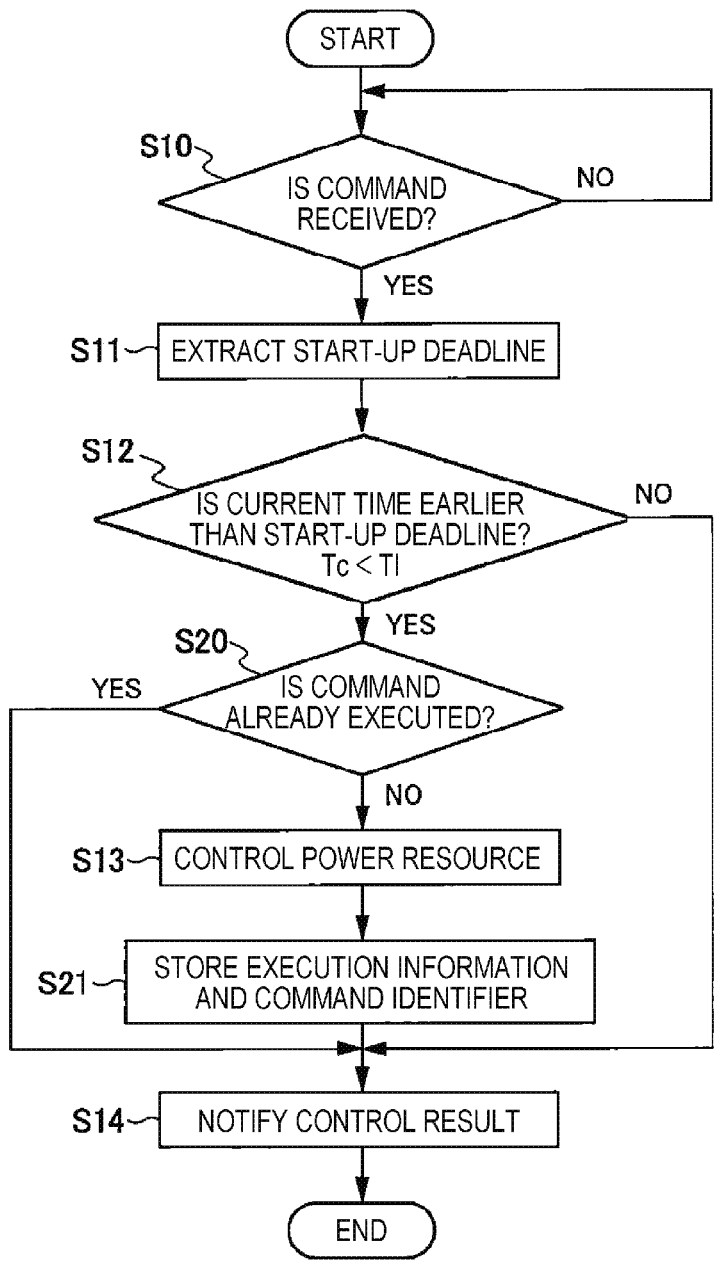

[FIG.12]
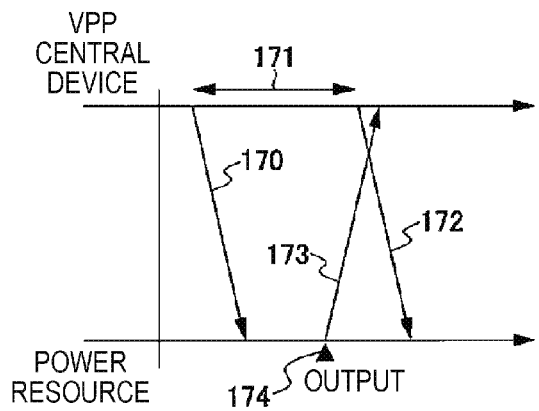
[FIG.13]
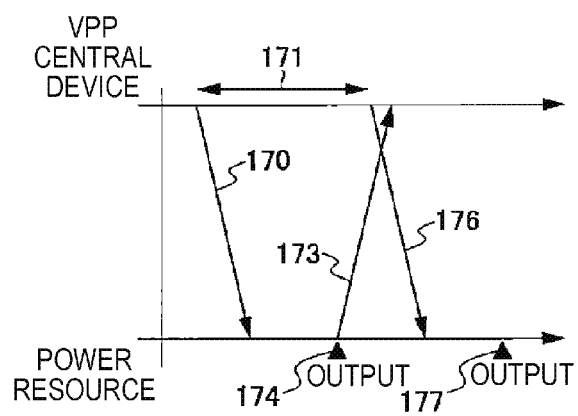
[FIG.14]
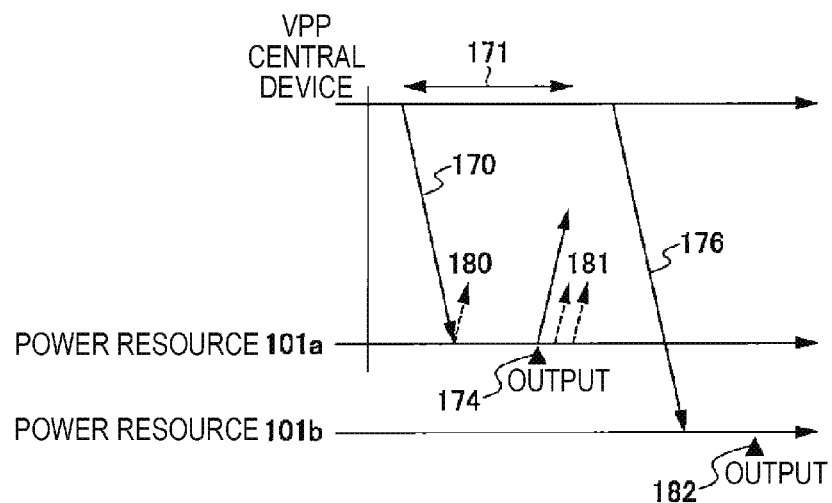

[FIG.15]
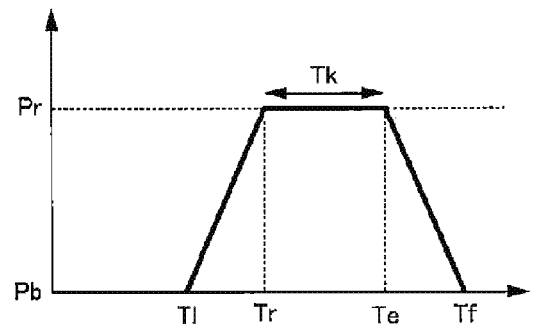
[FIG.16]
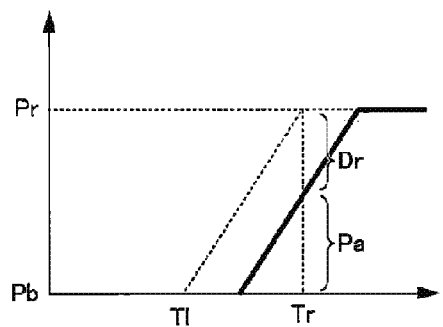
[FIG.17]
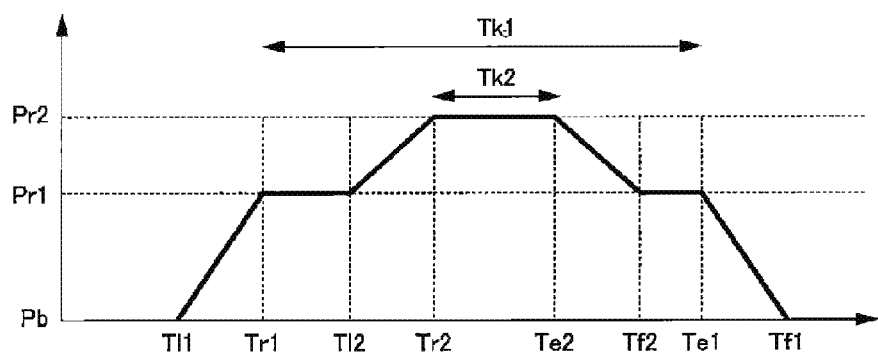
[FIG.18]
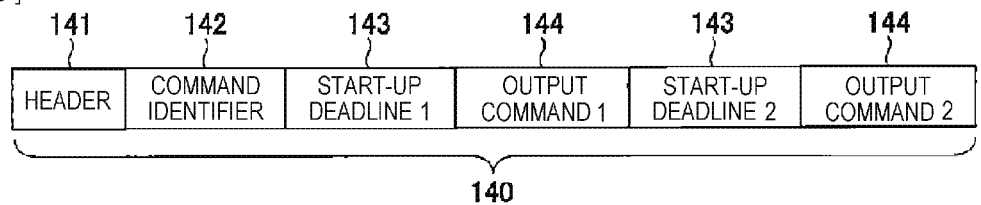

[FIG.19]
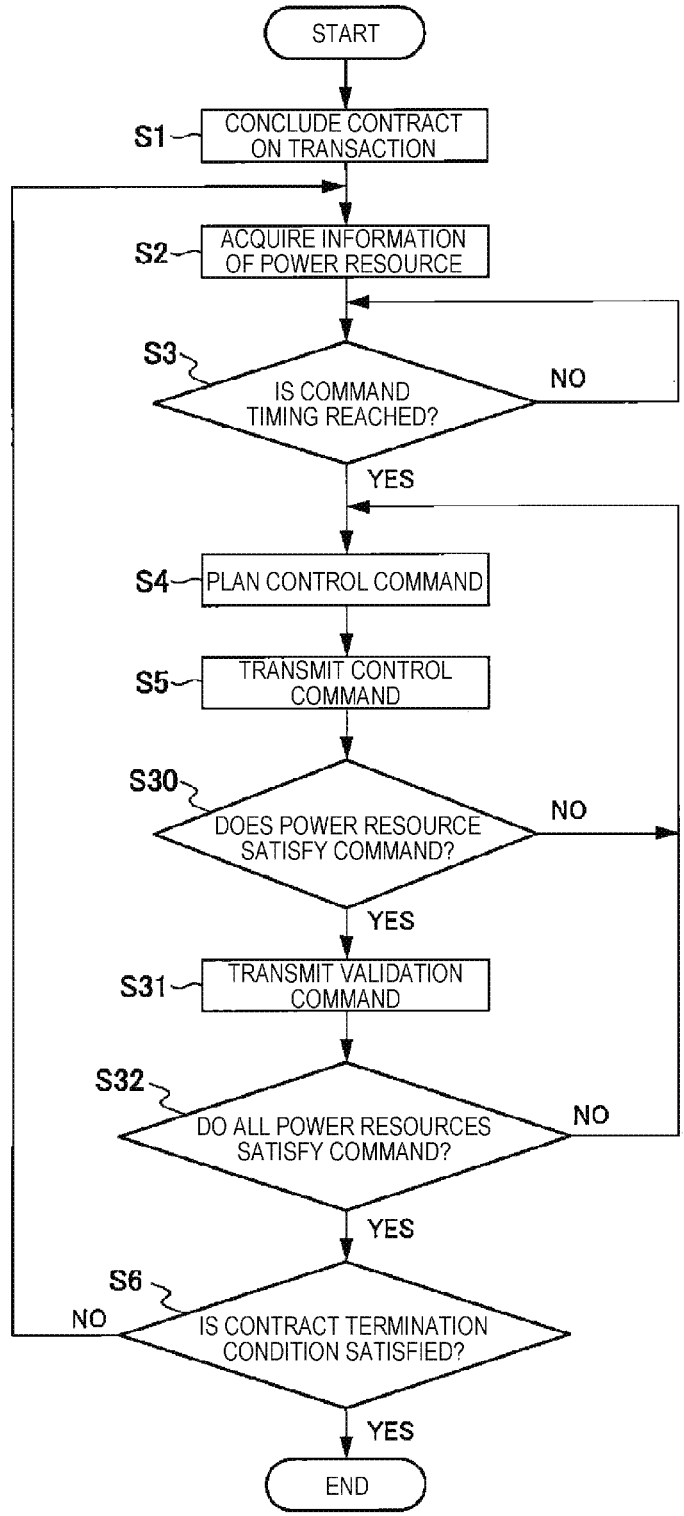

[FIG.20]
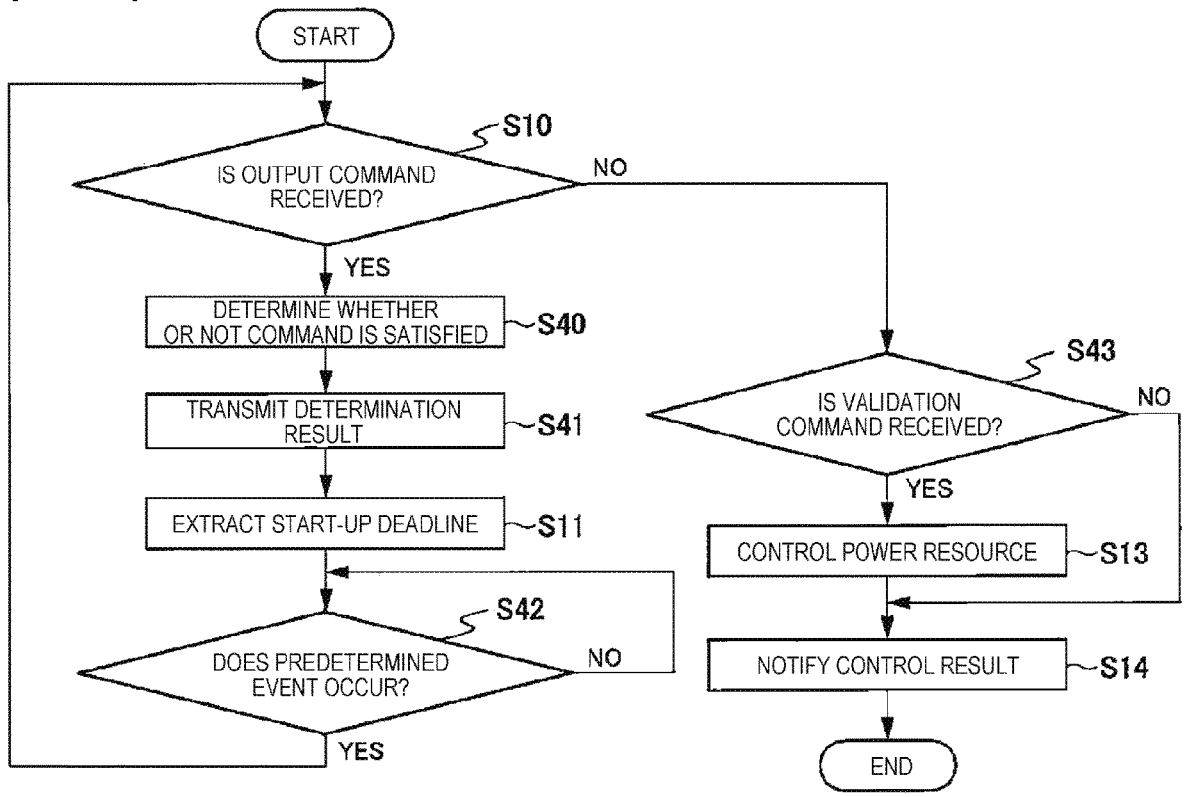
[FIG.21]
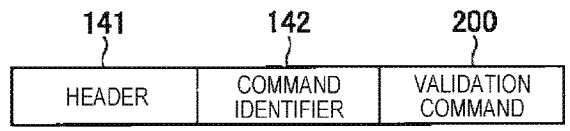
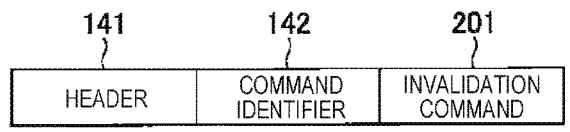

[FIG.22]
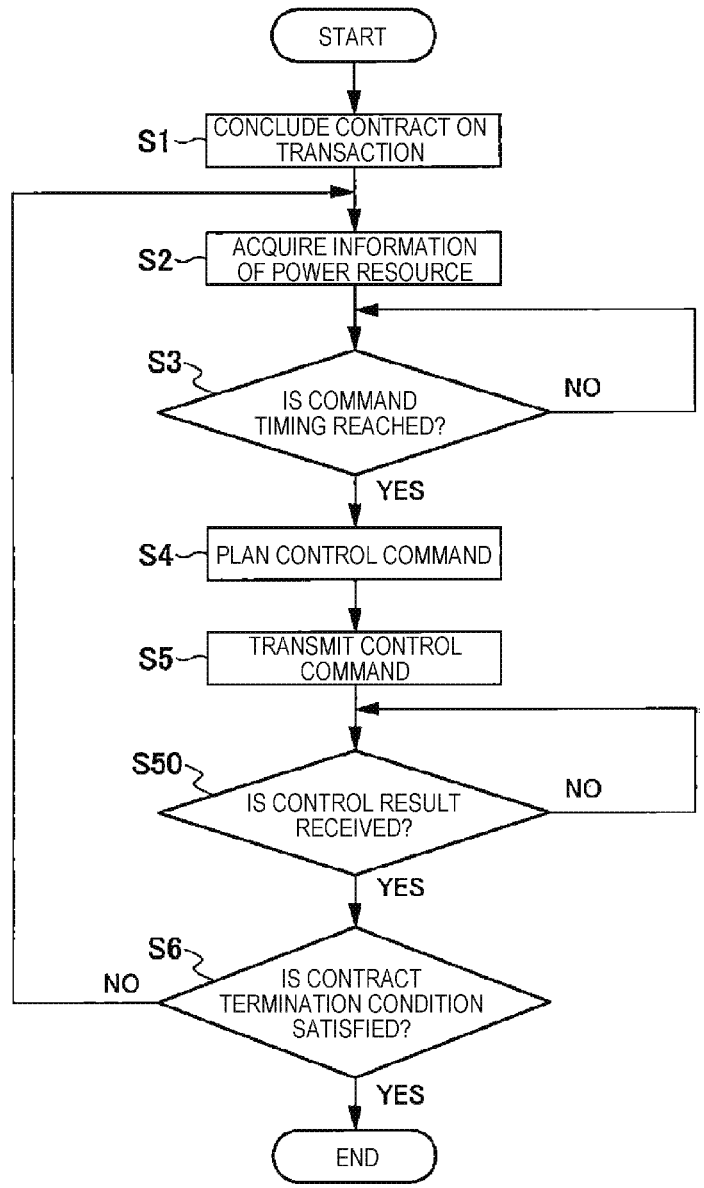

[FIG.23]
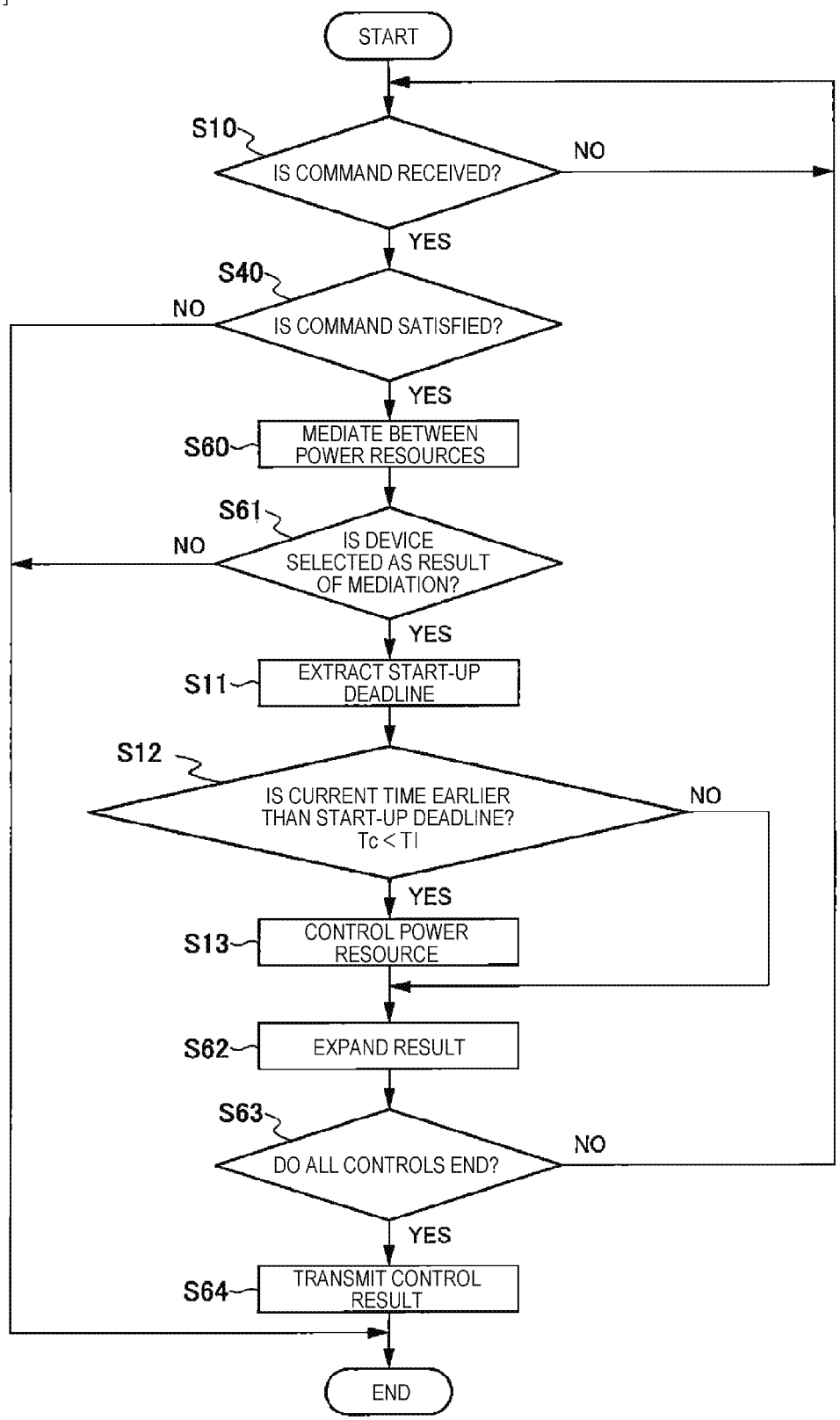

[FIG.24]
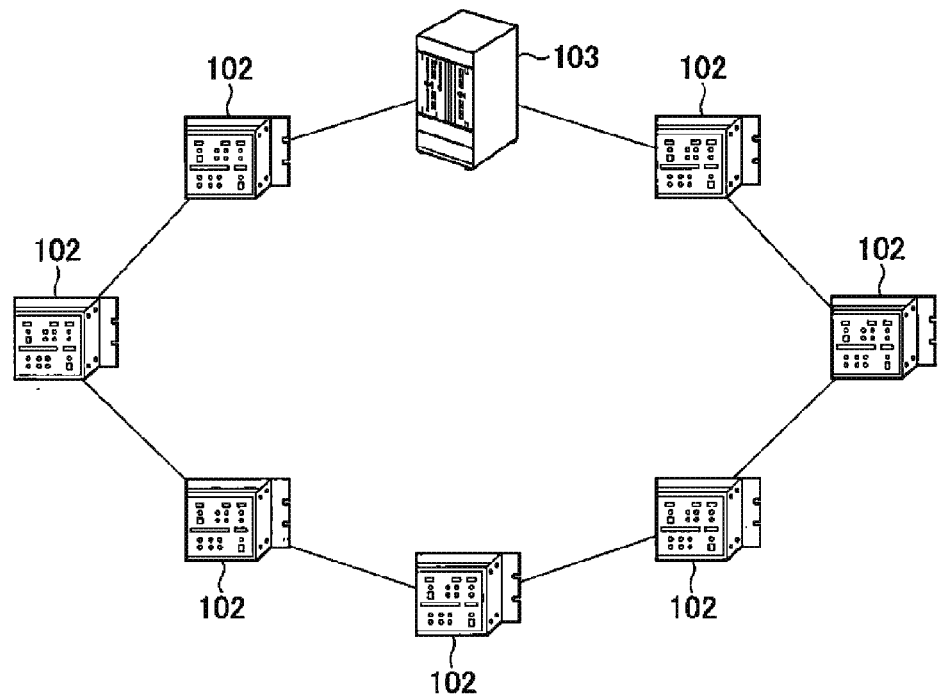
[FIG.25]
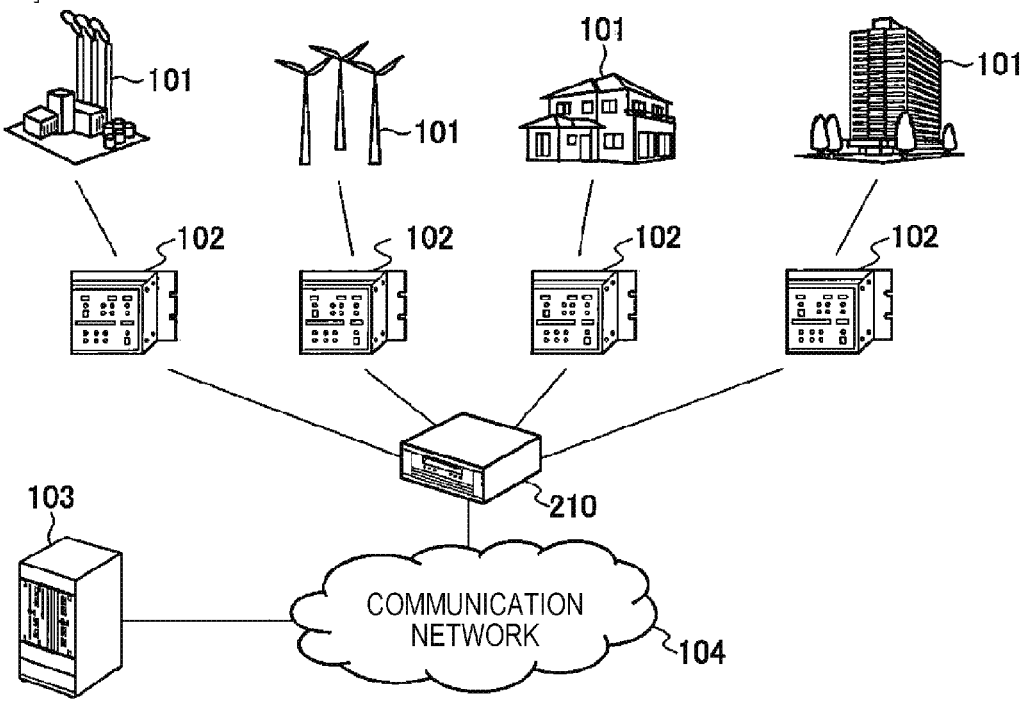

[FIG.26]
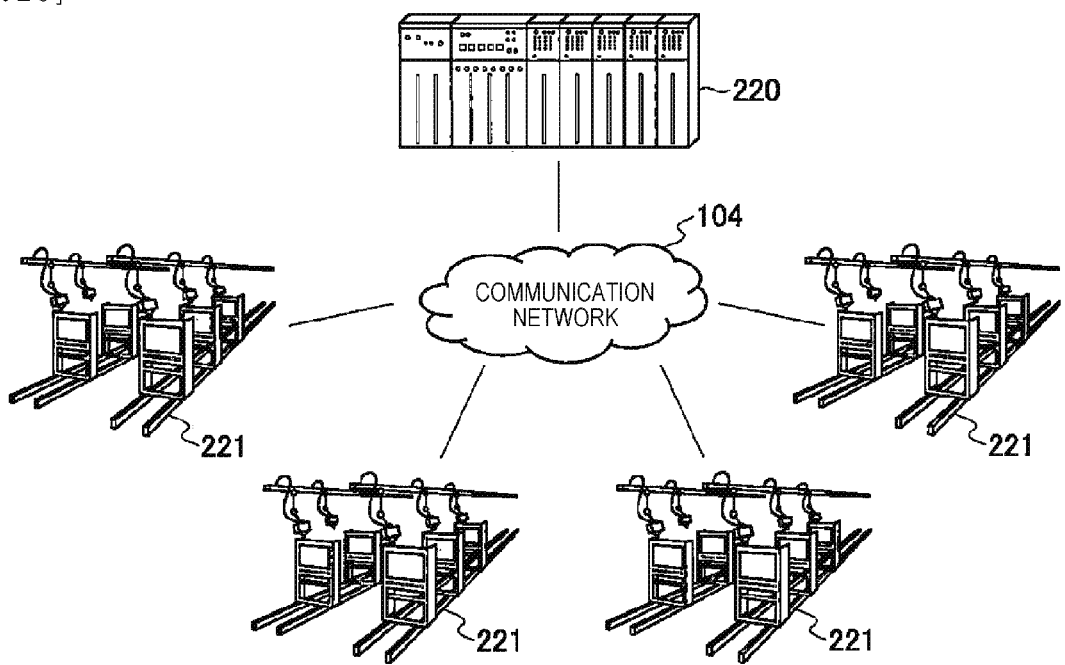

[FIG.27]
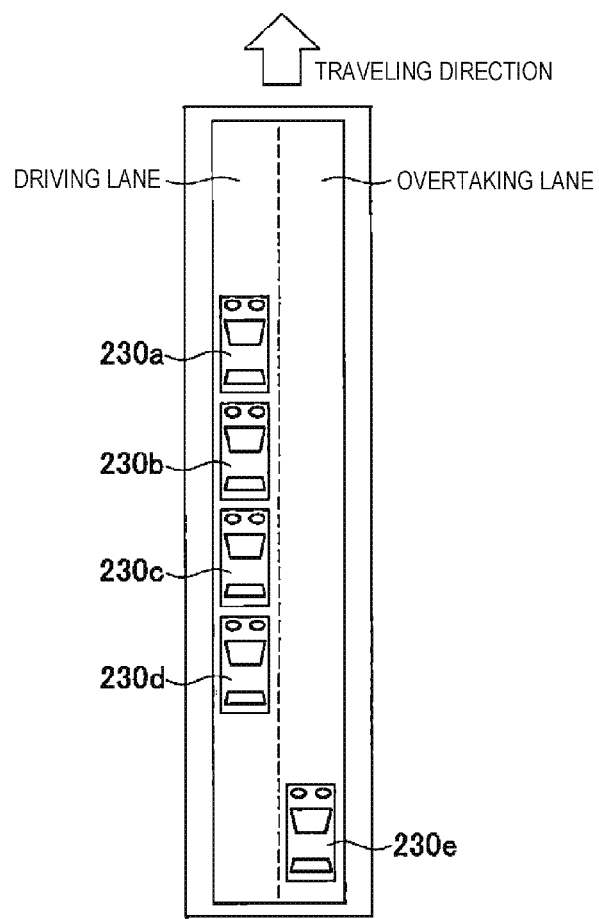
[FIG.28]
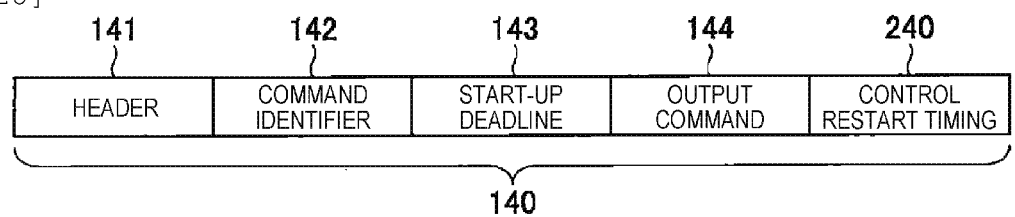

COMMUNICATION METHOD, CENTRAL CONTROL DEVICE AND INDIVIDUAL CONTROL DEVICE

TECHNICAL FIELD

The present invention relates to a communication method, a central control device, and an individual control device.

BACKGROUND ART

In a distributed control system in which respective control devices provided at a plurality of sites are connected via a network such that the respective control devices are distributed and control respective devices to be controlled at the sites, an operation of each of the respective control devices is determined by communication of a packet including a control command. In the following description, the control device that controls the device to be controlled at each of the sites will be referred to as "individual control device", and a control device that transmits a control command to each of the individual control devices will be referred to as "central control device".

The performance of the distributed control system depends on the communication performance of the network. Specifically, the real-time performance relating to a communication band or communication delay or the communication performance such as reliability of communication transmission depends on the performance of the distributed control system. Therefore, it is preferable to adopt a dedicated communication network that performs reliable communication as the network via which the central control device and each of the individual control devices are connected in the distributed control system.

On the other hand, it is required to reduce the costs necessary to construct the distributed control system, and the use of a versatile IT technique or the sharing of a network resource (specifically, the use of a public network) is considered.

In general, the improvement of the communication performance and the economic system construction are contrary to each other. For example, the use of a public network impairs the real-time performance of communication. Accordingly, a distributed control system in which it is desired to simultaneously improve the economic efficiency and the communication performance is required for various industrial uses. For example, in a distributed control system that performs autonomous traveling or a group control of virtual power plants (hereinafter, referred to as "VPP") of a power system or moving objects such as automobiles, construction machines, drones, or airplanes, it is required to simultaneously improve the communication performance and the economic efficiency. Further, even in a distributed control system such as a control device (controller) of a production line or a manufacturing device in a factory, a machine tool, or a plant or a FA (Factory Automation) system such as a PLC (Programmable Logic Controller), it is necessary to simultaneously improve the communication performance and the economic efficiency.

In particular, recently, as one attempt for further improving the efficiency of the distributed control system based on the concept of IOT (Internet of Things), for example, Industrie 4.0, Industrial Internet, or IVI (Industrial Value Chain Initiative) has been attempted.

CITATION LIST

Patent Literature

PTL 1: JP-A-2016-103965

SUMMARY OF INVENTION

Technical Problem

In general, communication in a network has various kinds of uncertainty, which causes deterioration in the performance of the control system. In particular, when a network is shared for the economic efficiency, an increase in communication delay of a control packet or loss of a control packet itself may occur. In order to acknowledge that the control packet is transmitted to a transmission destination, the central control device as a transmission source of the control packet needs to receive an acknowledgement (generally called "ack") from the transmission destination. However, the acknowledgement packet (ack packet) itself has the possibility of an increase in communication delay and packet loss.

Further, in addition to the communication abnormality, a device to be controlled itself may also have an abnormality. In this case, the device to be controlled may not respond to all the control commands or may respond to only a part of the control commands, and there are many cases that cannot be dealt with by the acknowledgement using the ack packet.

An example of a general method of dealing with the communication abnormality and the device abnormality in the transmission source includes a method of setting an appropriate time-out and retransmitting a control packet after the expiration of a time-out. However, when the transmission source does not receive an acknowledgement packet even after the expiration of a time-out, the transmission source cannot determine whether the communication abnormality occurs in a forward path (communication path from the transmission source to the transmission destination) or in a backward path (communication path from the transmission destination to the transmission source).

In particular, in the distributed control system, some control operation is executed in the transmission destination. Therefore, depending on positions where the communication abnormality occurs, a desired control operation is not executed, or there is a problem in that a double start-up of the control operation or a delayed start-up of the control operation after the execution of alternative means occurs such that the control operation becomes excessive as a whole.

JP-A-2016-103965 (PTL 1) describes a power control system including a plurality of power generation devices or loading devices that are connected to each other via a network, in which in a case where a power ID associated with surplus power is added to a power supply request and this power supply request is transmitted, the power ID and a validity period of the surplus power are associated with each other. In the technique described in PTL 1, the occurrence of defects at the time of the communication abnormality can be prevented by treating a power ID in which the validity period is expired as an ID for which surplus power cannot be supplied.

However, even in a case where the validity period is set as described in PTL 1, when the validity period is inappropriately set, there is a problem in that a power control using surplus power cannot be appropriately executed. For example, even in a case where the supply of surplus power is instructed in order to obtain power supply from the transmission source as planned and the validity period is set during the execution of the instruction, when the validity period is very short, surplus power is not effectively utilized at the time of the communication abnormality, and thus the controllability deteriorates. Conversely, when the validity period is very long, a period of time required to use up surplus power is long, the power supply is unstable, and thus the reliability of power control deteriorates. In addition, when the validity period is short, the validity period is expired at the time of the communication abnormality, the number of times for retransmission of the control packet increases, and thus a load on a communication network increases.

Accordingly, when a relatively unstable communication network such as a public network is used in the distributed control system that performs power control, there is a problem in that it is extremely difficult to set the validity period such that the efficient use of generated power or surplus power and the stabilization of power supply as a whole can be realized.

In the above description, the problem has been described using the distributed control system that performs power control as an example. However, even in distributed control systems that execute various other controls, it is also difficult to set the validity period when the validity period is set in a control command.

An object of the present invention is to provide a communication method, a central control device, and an individual control device, in which when a distributed control system is constructed, the reliability and controllability of the control system can be realized.

Solution to Problem

In order to solve the above-described problem, for example, configurations described in the claims are adopted.

The present application includes a plurality of means for solving the problem, and one example thereof is a communication method including communicating a packet including a command for instructing to control a device to be controlled, identification information of the command, and a start-up deadline of the command.

According to the present invention, a malfunction such as delayed start-up, double start-up, or excessive output that occur due to a communication abnormality of a control packet or a device abnormality of a target to be controlled can be prevented, and the reliability and control performance of the control system can be improved.

Objects, configurations, and effects other than those described above will be clarified by describing the following embodiments.

BRIEF DESCRIPTION OF DRAWINGS

FIG. 1 is a system configuration diagram illustrating an overall configuration of a distributed control system according to a first embodiment of the present invention.

FIG. 2 is a block diagram illustrating a hardware configuration example of a VPP central control device according to the first embodiment of the present invention.

FIG. 3 is a functional block diagram illustrating the VPP central control device according to the first embodiment of the present invention.

FIG. 4 is a diagram illustrating a packet format example according to the first embodiment of the present invention.

FIG. 5 is a block diagram illustrating a hardware configuration example of an individual control device according to the first embodiment of the present invention.

FIG. 6 is a functional block diagram illustrating the individual control device according to the first embodiment of the present invention.

FIG. 7 is a flowchart illustrating a control execution procedure of the VPP central control device according to the first embodiment of the present invention.

FIG. 8 is a flowchart illustrating a control execution procedure of the individual control device according to the first embodiment of the present invention.

FIG. 9 is a time chart illustrating an operation example (example 1: an example in which a double start-up preventing processing is not executed) according to the first embodiment of the present invention.

FIG. 10 is a time chart illustrating an operation example (example 1: an example in which the double start-up preventing processing is executed) according to the first embodiment of the present invention.

FIG. 11 is a flowchart illustrating an execution procedure of the individual control device when the time chart illustrated in FIG. 9 or 10 is executed.

FIG. 12 is a time chart illustrating an operation example (example 2: another example of the double start-up preventing processing; a case where retransmission is executed) according to the first embodiment of the present invention.

FIG. 13 is a time chart illustrating an operation example (example 2: still another example of the double start-up preventing processing; a case where an alternative command is executed) according to the first embodiment of the present invention.

FIG. 14 is a time chart illustrating an operation example (example 3: an example of an alternative start-up processing) according to the first embodiment of the present invention.

FIG. 15 is a time chart illustrating a setting example (example 1: a case where a start-up is executed during a period from an output start to an output stop according to a start-up instruction) of a start-up deadline according to the first embodiment of the present invention.

FIG. 16 is a time chart illustrating a setting example (example 1: a case where an output is executed after delayed from the start-up deadline) of the start-up deadline according to the first embodiment of the present invention.

FIG. 17 is a time chart illustrating a setting example (example 2) of the start-up deadline according to the first embodiment of the present invention.

FIG. 18 is a diagram illustrating an example of a packet including an invalidation command according to the first embodiment of the present invention.

FIG. 19 is a flowchart illustrating a control execution procedure of the VPP central control device according to a second embodiment of the present invention.

FIG. 20 is a flowchart illustrating a control execution procedure of the individual control device according to the second embodiment of the present invention.

FIG. 21 is a diagram illustrating a packet format example according to the second embodiment of the present invention.

FIG. 22 is a flowchart illustrating a control execution procedure of the VPP central control device according to a third embodiment of the present invention.

FIG. 23 is a flowchart illustrating a control execution procedure of the VPP individual control device according to a third embodiment of the present invention.

FIG. 24 is a configuration diagram illustrating an example (example 1) of a network to which each of the embodiments of the present invention is applied.

FIG. 25 is a configuration diagram illustrating an example (example 2) of a network to which each of the embodiments of the present invention is applied.

FIG. 26 is a configuration diagram illustrating an example in which each of the embodiments of the present invention is applied to a control of production lines.

FIG. 27 is a configuration diagram illustrating an example in which each of the embodiments of the present invention is applied to an autonomous traveling control.

FIG. 28 is a diagram illustrating a packet format example when the present invention is applied to an autonomous traveling control.

DESCRIPTION OF EMBODIMENTS

1. First Embodiment

Hereinafter, a first embodiment of the present invention will be described with reference to FIGS. 1 to 18.

In a first embodiment of the present invention, an example of a distributed control system that manages a plurality of power generation devices or loading devices and is applied to a virtual power plant (hereinafter, referred to as "VPP") functioning as one power plant will be described. In the following description, as a device constituting the distributed control system, a device that is a transmission source of a control command will be referred to as "central control device (VPP central control device)". In addition, a device that receives a control command from the central control device in a network and controls a device to be controlled based on the received control command will be referred to as "individual control device".

[1-1. Overall Configuration Example of System]

FIG. 1 illustrates an overall configuration example of the system according to the first embodiment of the present invention.

The power system 100 is an arbitrary system to which various power resources 101 are connected, and includes a transmission system and a distribution system from a power plant or a substation.

The power resource 101 is a power generation resource that can provide a power increased/decreased output to the power system 100 or a power load that can provide an increased/decreased load. Specific examples of the power resource 101 include power generation devices of hydraulic power generation, thermal power generation, storage batteries, photovoltaic power generation, wind power generation, geothermal power generation, biomass power generation, biogas power generation, wave-activated power generation, nuclear power generation, and the like. In addition, specific examples of the power resource 101 include a power loading device at home and a power loading device in a building or a factory. Other examples of the power resource 101 include a prosumer that is a power resource having properties of a power source and a load. In the VPP, when a control of reducing power to be consumed by the power loading device is executed, the reduced power can be treated as virtually generated power.

FIG. 1 illustrates an example in which a plurality of power resources 101 are connected to the power system 100. However, the single power resource 101 may be included in the VPP. In addition, one specific VPP company may be considered as one power resource 101.

Regarding each of the power resources 101, a power generation state or a power consumption state is monitored by an individual control device 102 and is optionally controlled. That is, the power resource 101 as a device to be controlled is monitored and controlled by the individual control device 102. Each of the individual control devices 102 bidirectionally communicates with a VPP central control device 103 via a communication network 104.

The individual control device 102 monitors the power resource 101 and transmits the acquired information to the VPP central control device 103. In addition, the power resource 101 is set and controlled based on the control command received by the individual control device 102 from the VPP central control device 103. The number of the power resources 101 connected to each of the individual control devices 102 may be one or plural. In addition, the individual control device 102 may be incorporated into the power resource 101.

The VPP central control device 103 is connected to a group of the power resources 101, to which the individual control device 102 is connected, via the communication network 104 and acquires the information of the power resources 101 or controls an operation thereof.

The number of the VPP central control devices 103 may be one or plural. In addition, when the number of the VPP central control devices 103 is plural, one gateway device or calculator may be connected to the communication network 104 to be connected to another calculator in a closed network. Alternatively, when the VPP central control device 103 is configured using a plurality of calculators, the calculators may be individually connected to the communication network 104.

As a specific example of the VPP central control device 103, a calculator such as a personal computer (PC), a work station, a server, a control PC, or cloud computing can be used.

The communication network 104 connects the VPP central control device 103 and the individual control device 102 to each other.

The communication network 104 may be either a public network or a private network. In addition, a communication method in the communication network 104 may be either a wired communication method or a wireless communication method.

Further, as a specific example of the communication method that is applicable to the communication network 104, the following examples can be used.

That is, examples of the communication method include IEEE 802.3 standard, various industrial networks, IEC 61784 standard, IEC 61158 standard, IEC 61850 standard, IEC 62439 standard, IEC 61850-7-420 standard, IEC 60870-5-104 standard, DNP (Distributed Network Protocol) 3 standard, and IEC 61970 standard. Further, other examples of the communication method include IEEE 802.1 AVB standard, CAN (Controller Area Network: registered trade name), DeviceNet, RS-232C standard, RS-422 standard, RS-485 standard, ZigBee (registered trade name), Bluetooth (registered trade name), IEEE 802.15 standard, IEEE 802.1 standard, various kinds of mobile communication, OpenADR, and ECHONET Lite (registered trade name). These communication methods are preferable examples, but the communication method that is applicable to the communication network 104 is not limited to these examples.

In order to manage a timing such as a start-up deadline described below, it is necessary to synchronize timings between the VPP central control device 103 and the individual control device 102. As a timing synchronization method, a timing synchronization method corresponding to a timing synchronization controller 134 (FIGS. 3 and 6) described below is used according to, for example, a synchronization accuracy that is required to satisfy a contract condition.

[1-2. Hardware Configuration Example of VPP Central Control Device]

FIG. 2 illustrates a hardware configuration of the VPP central control device 103.

The VPP central control device 103 includes a CPU (central control unit) 111, and the CPU 111 transmits a program from a non-volatile storage medium 115 to a memory 114 and executes a control processing as the VPP. Examples of the program (software) to be executed by the CPU 111 include an operating system (hereinafter referred to as "OS") and an application program that operates on the OS. As the CPU 111, a CPU including multiple cores such as a multi-core CPU may be used.

A communication controller 112 receives transmission data such as a transmission request from the software that operates on the CPU 111 and transmits a packet to the communication network 104 using a physical layer processor (PHY) 113. In addition, the communication controller 112 transmits data received by the physical layer processor 113 from the communication network 104 to the CPU 111, the memory 114, and the non-volatile storage medium 115 via a bus 116. Implementations of the communication controller 112 include an IC such as FPGA, CPLD, ASIC, or a gate array. Alternatively, the communication controller 112 may be integrated with the CPU 111. The communication controller 112 may be a communication device for IEEE 802.3 standard including a MAC layer and a PHY layer.

Further, the communication controller 112 may also include the physical layer processor 113. In this case, implementations of the communication controller 112 include a MAC (Media Access Control) chip for IEEE 802.3 standard, a physical layer (PHY) processing chip, and a composite processing chip of MAC and PHY. The communication controller 112 may include a chip set that controls the CPU 111 or an information path in a computer.

The physical layer processor 113 is an IC as a transceiver that implements a communication function with the communication network 104. Examples of a communication standard provided by the physical layer processor 113 include a physical layer (PHY) processing chip for IEEE 802.3 standard. In the configuration illustrated in FIG. 2, the physical layer processor 113 and the communication controller 112 are connected to each other, and the processing of the MAC layer defined by IEEE 802.3 standard is executed by the communication controller 112. The configuration illustrated in FIG. 2 is merely exemplary, and various configurations are applicable as the configuration that performs communication via the network 104.

The memory 114 is a temporary storage area for operating the CPU 111 and stores the OS, the application program, and the like transmitted from the non-volatile storage medium 115. Examples of the memory 114 include a static RAM, a DRAM, and an NVRAM.

The non-volatile storage medium 115 is a storage medium for information and is used to store programs for operating the CPU 111, for example, the OS, the application, or a device driver and to store the results of executing the programs. Examples of the non-volatile storage medium 115 include a hard disk drive (HDD), a solid state drive (SSD), and a flash memory. In addition, as a easily removable external storage medium, the use of a floppy disk (FD), a CD, a DVD, a Blue Ray (registered trade name), a USB memory, a compact flash (registered trade name), or the like can be considered.

The bus 116 connects the CPU 111, the communication controller 112, the memory 114, and the non-volatile storage medium 115 to each other. Examples of the bus 116 include a PCI bus, an ISA bus, a PCI Express bus, a system bus, a memory bus, and an on-chip bus.

In the hardware configuration, an IC, a CPU, or a SoC (System on Chip) FPGA integrated with one kind or two or more kinds selected from the CPU 111, the communication controller 112, the physical layer processor 113, the memory 114, and the non-volatile storage medium 115 may be used.

[1-3. Configuration Example of VPP Central Control Device]

FIG. 3 is a block diagram illustrating a functional configuration of the VPP central control device 103.

A VPP controller 130 acquires information of the power resource 101 and the individual control device 102 as targets to be controlled from a power resource information storage unit 131 and plans a command to each of the power resources 101. Examples of the command from the VPP controller 130 include a command of an output value to the power resource 101, a designation of power reduction to a power load, and a charging and discharging command to a storage battery. The command planned by the VPP controller 130 and a command identifier are transmitted to a communication unit 133 and a start-up deadline determination unit 132.

The VPP controller 130 plans a command value to each of the power resources 101 in consideration of the economic efficiency relating to an output, a response speed of an output change, an influence of power load reduction on the comfort level of a user (for example, an influence of a temperature change of an air conditioner), a rated output of a power source, a maximum capacity, the kind of a power source, and the like.

For example, the VPP controller 130 is implemented as software that operates on the CPU 111 illustrated in FIG. 2.

The power resource information storage unit 131 is a storage unit of the information of the power resource 101.

The kinds of information of the power resource 101 stored by the power resource information storage unit 131 include the economic efficiency relating to an output, a response speed of an output change, an influence of power load reduction on the comfort level of a user (for example, an influence of a temperature change of an air conditioner), a rated output of a power source, a maximum capacity, and the kind of a power source.

The information stored in the power resource information storage unit 131 may be acquired from the individual control device 102 via the communication network 104 and may be stored in advance as long as it is information that is statically determined depending on the kind of the power resource 101.

The information of the power resource 101 stored in the power resource information storage unit 131 is provided to the VPP controller 130 and the start-up deadline determination unit 132. The power resource information storage unit 131 is implemented by the memory 114 or the non-volatile storage medium 115 illustrated in FIG. 2.

The start-up deadline determination unit 132 executes a start-up deadline determination processing of calculating a start-up deadline by which each of the power resources 101 starts an output based on planned information notified from the VPP controller 130 and the information of the power resource 101 acquired from the power resource information storage unit 131. The start-up deadline calculated by the start-up deadline determination unit 132 is transmitted to the communication unit 133.

Although the details of the start-up deadline calculated by the start-up deadline determination unit 132 will be described below, the start-up deadline is calculated in consideration of the performance of a device constituting the power resource 101. Here, one performance of the device is a period of time required to start or stop the device.

A time format in the start-up deadline may be an absolute time or a relative elapsed time from the time when a command is transmitted from the VPP central control device 103.

For example, the start-up deadline determination unit 132 is implemented as software that operates on the CPU 111 illustrated in FIG. 2.

The communication unit 133 is an execution unit of a communication function of transmitting a command packet to the individual control device 102 or receiving a packet transmitted from the individual control device 102 via the communication network 104. When the packet is transmitted to the individual control device 102, a command identifier and an output command transmitted from the VPP controller 130 and data including the start-up deadline transmitted from the start-up deadline determination unit 132 are converted into a format conforming to a protocol format of the communication network 104.

The timing synchronization controller 134 synchronizes timings between the VPP central control device 103 and the individual control device 102 according to a predetermined timing synchronization protocol. Examples of the timing synchronization protocol include IEEE 1588, NTP, and SNIP. Alternatively, a method of using GPS, IRIG-B, or the like may be used. The synchronized timing may be an absolute universal time such as the coordinate universal time or may be a common time in the control system.

The timing synchronization controller 134 may be implemented by software on the CPU 111 or as a hardware logic when the communication controller 112 is configured by a LSI (including FPGA and CPLD). When the timing synchronization controller 134 is implemented by software on the CPU 111, timing error information and communication delay may be stored in the timing synchronization controller 134.

Alternatively, the timing synchronization controller 134 may be configured by both the software on the CPU 111 and the communication controller 112. In this case, a function of measuring a transmission timing or a reception timing of a timing synchronization packet or the generation of the timing synchronization packet may be executed by the communication controller 112.

[1-4. Packet Format Example]

FIG. 4 illustrates an example of a packet format that is transmitted to the communication network 104 by the VPP central control device 103.

As a configuration, a packet 140 includes a header 141, a command identifier 142, a start-up deadline 143, and an output command 144.

The header 141 included in the packet 140 is destination information required to transmit the packet 140 to the individual control device 102 as a transmission destination or a program that operates on the individual control device 102. The header 141 includes at least an identifier of the individual control device 102 as transmission destination or the program that operates on the individual control device 102 and a data type. When a communication protocol is configured hierarchically, the data type includes an identifier of a lower-level protocol. In addition, the data type represents an output command from the VPP central control device 103 to the power resource 101. Examples of the header 141 include a header of a communication protocol used in the communication network 104.

The command identifier 142 included in the packet 140 is an identifier for a control command. The command identifier 142 is different from the identifier of the transmission destination in the header 141. When a given amount of power is generated or a power load is reduced at a give time according to a transaction based on which the VPP central control device 103 executes a control, the command identifier 142 is an identifier indicating the corresponding power generation command or reduction command. For example, a case where one specific power resource 101 may not respond to a command from the VPP central control device 103 will be described. In this case, the VPP central control device 103 transmits the same command identifier 142 to another power resources 101 such that the other power resource 101 starts up alternatively. Here, the transaction based on which the VPP central control device 103 executes a control refers to, for example, a contract (power generation or power reduction) as the VPP, conclusion of the contract, or a power market transaction or a negotiated transaction agreed on the contract. When the transaction is simply expressed in the following description, the transaction refers to, for example, a contract (power generation or power reduction) as the VPP, conclusion of the contract, or a power market transaction or a negotiated transaction agreed on the contract.

The command identifier 142 indicates an identifier of a power market transaction, transaction counterparties (including a power transmission company, a power distribution company, a power retailer company, or other operation agencies), a contract number, a contract condition, a VPP company name, a penalty condition such as a financial penalty for breach of contract, and a condition relating to an output (a deviation limit or an allowable output range). That is, the command identifier 142 indicates the kind of a power market transaction such as the intraday market or the day-ahead market, the name of a power market, and the like.

The command identifier 142 may be an identifier (hereinafter, referred to as "partial identifier") indicating a partial output (partial command) in a total output. For example, in a case where 10 MW of power in total is output according to the contract, when this power is divided into five sets of 2 MW and commands are transmitted to five power resources 101, the command identifier 142 refers to an identifier for each of the five commands. As a result, even when the output values are the same, individual commands can be distinguished from each other. Even in a case where one power resource 101 fails to output the power and another power resource 101 starts up alternatively, the possibility that the output power exceeds the total output can be reduced, and the reliability for satisfying the contract condition can be improved.

Each of the command identifiers 142 or the partial identifier included in the command identifier 142 may a number that is sequentially assigned or a random number, or may be obtained by applying hash operation to information relating to the contract.

The individual control device 102 side does not need to grasp a determination method of the command identifier 142 (for example, a determination method of sequentially assigning a number or a determination method of using hash operation) in order to prevent double start-up. However, in order to prevent double start-up, the individual control device 102 needs to store the received command identifier 142. In addition, when the individual control device 102 side autonomously operates according to the contract condition or the command details, the determination method of the command identifier 142 may be shared with the VPP central control device 103. When the determination method is shared, the command identifier determination method may be notified from the VPP central control device 103 to the individual control device 102 after the conclusion of a transaction or a contract or before a control operation, or may be set and registered to the individual control device 102 using a predetermined input means of the individual control device 102.

The autonomous operation of the individual control device 102 is an operation of checking the start-up deadline based on the contract condition or an operation of adjusting generated power or reduced power load based on a state of the power resource 101 when a deviation limit or a command for a penalty is received. By double-checking the calculated start-up deadline of the VPP central control device 103, the reliability of the system can be improved. In addition, by executing a control in consideration of the state of the power resource 101 immediately before the operation, an effect of improving the possibility of satisfying the contract condition can be obtained.

The start-up deadline 143 included in the packet 140 refers to a start deadline of the operation of the power resource 101 that is calculated by the start-up deadline determination unit 132 of the VPP central control device 103. Examples of a format of the start-up deadline 143 include the time formats of the timing synchronization protocol, for example, IEEE 1588 standard, NTP, or SNTP. Alternatively, the format of the start-up deadline 143 may be a unique format indicating an absolute time or a relative time from a predetermined reference time.

The output command 144 included in the packet 140 refers to a power generation command or a power load reduction command that is calculated by the VPP controller 130 of the VPP central control device 103.

These parameters may be included in different packets. In this case, it is considered to transmit the packets along with identifiers associated with the respective packets. As this identifier, the command identifier is used.

Alternatively, commands including the command identifier 142, the start-up deadline 143, and the output command 144 may be included in one packet and transmitted. At this time, only one common command identifier 142 may be included in the packet for commands having the same command identifier 142. Alternatively, the command identifier 142 may be included per set of commands having the same command identifier 142.

[1-5. Hardware Configuration Example of Individual Control Device]

FIG. 5 illustrates a hardware configuration example of the individual control device 102.

The individual control device 102 has a hardware configuration that is basically the same as the hardware configuration of the VPP central control device 103 of FIG. 2 described above, but includes an input/output unit 150 for controlling the power resource 101 or acquiring the information of the power resource 101. As the input/output unit 150, various digital input/output ICs or analog input/output ICs can be used. In FIG. 5, one signal line from the input/output unit 150 is illustrated. However, a plurality of signal lines may be provided depending on the configuration of the power resource 101 side.

Since the other hardware configuration of the individual control device 102 is the same as the hardware configuration of the VPP central control device 103 illustrated in FIG. 2, the description thereof will not be repeated.

[1-6. Configuration Example of Individual Control Device]

FIG. 6 is a block diagram illustrating a functional configuration of the individual control device 102.

A power resource controller 160 receives a control command from the VPP central control device 103 via the communication unit 133 and controls the power resource 101 based on the control command and setting information stored in a setting storage unit 161. In addition, the power resource controller 160 monitors the state of the power resource 101 and transmits the monitored state to the VPP central control device 103. As a transmission timing to the VPP central control device 103, for example, a case where the monitored state is regularly transmitted at a predetermined interval, a case where the state of the power resource 101 is changed, and a case where a request is transmitted from the VPP central control device 103 can be considered.

The power resource controller 160 includes the software that operates on the CPU 111 and the configuration of using the input/output unit 150 described above regarding the hardware configuration of FIG. 5.

The setting storage unit 161 stores the setting information required to control and monitor the power resource 101. The setting information includes a method of acquiring command information from the command identifier 142, power transaction information (for example, transaction counterparties, generated power, the amount of generated power, reduced power load, a minimum required value, a maximum required value, and an average required value of the amount of reduced power load, a restriction on the response time, or a penalty condition) and an operation result. The setting storage unit 161 is implemented, for example, by the memory 114 or the non-volatile storage medium 115 illustrated in FIG. 5.

[1-7. Control Example of VPP Central Control Device]

FIG. 7 is a flowchart illustrating a control execution procedure of the VPP central control device.

First, the VPP central control device 103 concludes a contract on a transaction relating to power generation or load reduction (Step S1). The contract on the transaction may be a transaction via a power market (the day-ahead market, the intraday market, the balancing market, the real-time market, or the capacity market) or may be a direct negotiated transaction without involving a power market.

By concluding the transaction, generated power or power load, regulations relating to the amount of power, the response time, a timing at which a command is notified from a transaction counterparty, a penalty condition, a reward form, and the like are determined. The regulations relating to the amount of power includes a minimum required value, an average required value, and a maximum required value. Examples of the penalty condition include a condition that the contract is canceled when an operation is not executed a predetermined number of times within a predetermined period of time and a condition that the amount of power generated is not allowed to exceed plus or minus 20% of a designated output value. Regarding the reward form, output required values are divided in stages, and a reward ratio or the like is assigned to each of the stages. For example, a regulation of paying 100% of a reference reward when 90% or higher of power can be generated with respect to the output required value can be considered.

Next, the VPP central control device 103 collects the information of the power resource 101 (Step S2). The information of the power resource 101 may be dynamically collected by the VPP central control device 103. However, depending on the kind of the power resource 101, the information of the power resource 101 may be statically collected and registered by the VPP central control device 103.

Next, whether or not a timing at which a command is transmitted from the VPP central control device 103 is reached is determined (Step S3). In Step S3, when it is determined that the timing at which the command is transmitted is not reached (NO, in Step S3), the device waits until the corresponding timing is reached. The timing at which the command is transmitted in Step S3 depends on the contract details in Step S1. For example, the timing at which the command is transmitted varies depending on a case, such as a case where a command is to be transmitted immediately after the conclusion of the contract, a case where the contract becomes valid at a predetermined timing, or a case where a start-up command is transmitted from a market or a transaction counterparty. In a case where a command is to be transmitted immediately after the conclusion of the contract, the information collection of the power resource 101 in Step S2 needs to be executed before the conclusion in Step S1.

When the timing at which the VPP central control device 103 transmits the command is reached (YES in Step S3), the VPP central control device 103 plans commands for a group of the power resources 101 as targets to be controlled (Step S4). Here, the VPP central control device 103 plans the distribution of the commands for the group of the power resources 101 based on predetermined evaluation criteria while satisfying the contract details in Step S1.

The evaluation criteria include economic efficiency, an influence of power load reduction on customers, reliability of the start-up of the power resource 101, failure possibility of the power resource 101, an increase in operational lifetime, and a combination thereof. In addition, the economic efficiency is, for example, a power generation cost of the power resource 101. Regarding the influence of power load reduction on customers, for example, when a loading device is an air conditioner, a situation where the comfort level of a user of the loading device changes along with a change in temperature setting can be considered. The reliability of the start-up of the power resource 101 is, for example, previous operation results. Further, the failure possibility of the power resource 101 or an increase in operational lifetime is, for example, a plan based on device failure prediction or an operation for increasing the lifetime such as prevention of frequent repeated start-up and stop.

After the processing in Step S4, the VPP central control device 103 transmits the commands planned in Step S3 to the individual control devices 102 of the respective power resources 101 via the communication network 104 (Step S5).

Next, the VPP central control device 103 determines whether or not a contract termination condition is satisfied (Step S6). When the contract termination condition is not satisfied in Step S6 (NO in Step S6), the procedure from Step S2 is repeated. For example, when a contract period is determined, the determination on whether or not the contract termination condition is satisfied is executed based on whether or not the period is expired. Alternatively, when the number of times of start-up is determined (for example, once), it is determined that the contract termination condition is satisfied when the start-up is executed the predetermined number of times. In addition, it may be determined that the contract termination condition is satisfied when a contract termination notification is received from a transaction counterparty, a market, or other operation agencies.

The flowchart of FIG. 7 illustrates an example of the control execution procedure. However, a control may also be executed according to a procedure different from that of FIG. 7. For example, the information collection in Step S2 may be executed before the conclusion of the transaction in Step S1. Alternatively, Step S2 may be simultaneously executed with Step S1 or the procedure from Step S3 to Step S6. That is, the VPP central control device 103 may execute the information collection in Step S2 regularly or when the state of the power resource 101 changes.

The planning of the control command in Step S4 may be executed before the reception of the timing at which the command is transmitted in Step S3. Alternatively, the planning of the control command in Step S4 may be executed more than once. The planning of the control command in Step S4 may be executed during the waiting of the reception of the command timing in Step S3 and may be executed again after the reception of the command timing in Step S3. At this time, unless evaluation indices of the plan such as the state of the power resource 101 changes, the command can be transmitted immediately. Alternatively, even when the evaluation criteria change, a period of time required for the planning and the command transmission can be reduced by recalculating a difference before and after the change.

[1-8. Control Example of Individual Control Device]

FIG. 8 is a flowchart illustrating a control execution procedure of the individual control device 102.

First, the individual control device 102 determines whether or not a command is received from the VPP central control device 103 (Step S10). In Step S10, when the command is not received (NO in Step S10), the device waits until the command is received from the VPP central control device 103. When it is determined that the command is received in Step S10 (YES in Step S10), the individual control device 102 extracts the start-up deadline 143 in the control packet (Step S11). Next, whether or not the current time $T_c$ is earlier than the extracted start-up deadline $T_l$ is determined (Step S12).

Here, when the current time $T_c$ is earlier than the start-up deadline $T_l$ (YES in Step S12), the individual control device 102 controls the power resource 101 according to the command details (Step S13). Here, when the control details are about a control to a power generation device, for example, a command for controlling an increase or decrease in output can be considered. Here, when the control details are about a control to a loading device, for example, a command for controlling an increase or decrease in power consumption can be considered. Examples of the control command in Step S13 include a command for the individual control device 102 controlling the power resource 101 regarding an output change speed, the response time, an increase or decrease in output or power consumption.

In addition, when the current time $T_c$ is not earlier than the start-up deadline $T_l$, that is, the start-up deadline $T_l$ is expired in Step S12 (NO in Step S12), the device proceeds to Step S14.

The individual control device 102 notifies the control result of the power resource 101 to the VPP central control device 103 (Step S14).

Examples of the notification details in Step S14 include the control result of the power resource 101 (success, failure, or partial success), an output value after the control result, a change amount, the reason for failure (for example, an abnormality of the power resource 101 or the expiration of the start-up deadline), and the elapsed time from the expiration of the start-up deadline. When power or the amount of power after the control is notified from the individual control device 102, the VPP central control device 103 can grasp the operation progress of the power resource 101 or an a shortfall thereof. As a result, the VPP central control device 103 can transmit an alternative command to another power resource 101 or can accumulate result data of the power resource 101 in the distribution plan such that the reliability and certainty of the execution of the control operation and the optimality of the plan can be improved.

The power resource 101 may be controlled immediately after the reception of the command in Step S10. However, the control of the power resource 101 may be executed after the device waits for a predetermined period of time. In this case, the waiting period may be included in the command from the VPP central control device 103. Alternatively, when an abnormality occurs in the power resource 101 at the time of the reception of the command in Step S10, the individual control device 102 may notify the VPP central control device 103 of information relating to the corresponding abnormality of the power resource 101 immediately.

In addition, in Step S14, the result may be notified to a communication device, a database, or a storage device different from the VPP central control device 103 in order to record the system operation of the VPP.

In addition, during the control procedure of the power resource 101 by the individual control device 102 illustrated in FIG. 8, the individual control device 102 may acquire the state of the power resource 101 and may notify the acquired state to the VPP central control device 103. Alternatively, before or after the procedure illustrated in FIG. 8, the individual control device 102 may acquire the state of the power resource 101 and may execute a processing including the notification to the VPP central control device 103.

[1-9. Example of Start-Up Deadline Determination Processing]

Next, a processing of determining the start-up deadline by the start-up deadline determination unit 132 of the VPP central control device 103 will be described.

The VPP central control device 103 makes a command plan and determines an output value of each of the power resources 101. The start-up deadline, which is used when this output value is controlled, is determined by the start-up deadline determination unit 132.

The start-up deadline that is determined by the start-up deadline determination unit 132 is determined based on the details of the transaction contract, the command plan in the VPP central control device 103, the performance of the power resource 101, and the performance of the individual control device 102.

When the start-up deadline determination unit 132 determines the start-up deadline, the start timing determined based on the contract or the response time from the reception of a start-up command from a transaction counterparty is determined. For example, when there is a regulation that the generation of higher than plus or minus 20% of power with respect to the designated output value is not allowed according to the contract, the start-up deadline is set to control each of the power resources 101 such that a variation in the amount of power of the entire VPP is within a predetermined range (plus or minus 20%). At this time, a certain period of time is required for each of the power resources 101 to actually start up and generate a predetermined amount of power or to stop power consumption after instructing the power resource 101 to start up or stop according to the performance of a power generation device or a loading device. Accordingly, the start-up deadline determination unit 132 determines the start-up deadline such the designated output value is as predetermined in consideration of the performance of the power resource 101 connected to each of the individual control devices 102 in the system. However, as described below, there may be a case where the power resource 101 that is transmitted a command cannot start up. Therefore, when a command is transmitted to another alternative means, the start-up deadline with a more margin may be set in consideration of, for example, a period of time required to transmit the command to the alternative means.

As a specific example of setting the start-up deadline, the contract details are assumed to be that the total output is power of 10 MW and the response time from the reception of a command from a transaction counterparty is 60 seconds. It is assumed that one specific power resource 101 (hereinafter, the specific power resource 101 will be referred to as "power resource 101a") currently has an output of 0 and can generate an output of 100 kW per second. It is assumed that the VPP central control device 103 plans to distribute an output of 1 MW to the power resource 101a.

In this case, a command reception timing $T_o$ and a request response timing $T_r$ satisfy the following relationship based on the contract details.

$$T_r = T_o + 60 \text{ sec} \quad \text{(Expression 1)}$$

At this time, the start-up deadline Tl of the power resource 101a is calculated from the following expression.

$$T_l = T_r - (1 \text{ MW}/100 \text{ kW/sec}) = T_o + 50 \text{ sec} \quad \text{(Expression 2)}$$

Accordingly, the start-up deadline Tl is set to be 50 seconds later than the command reception timing or is 10 seconds earlier than the request response timing $T_r$. When the start-up deadline $T_l$ is set, the alternative means may not be considered.

Next, a processing of determining the start-up deadline in consideration of the alternative means will be described.

It is assumed that another power resource 101b different from the specific power resource 101a is present, the response speed is faster than that of the power resource 101a, and an output of 500 kW can be generate per second. In addition, it is assumed that the power resource 101a takes priority over the power resource 101b in the evaluation criteria of the plan of the VPP central control device 103. Here, regarding the setting of the priority, for example, it is assumed that the power generation cost of the power resource 101a is lower than that of the power resource 101b.

Here, for example, a time R required for switching to the power resource 101b (for example, a time required to detect an abnormality of the power resource 101a or communication delay of a command to the power resource 101b) is determined. In consideration of the time R required for switching to the power resource 101b, the start-up deadline $T_l$ is calculated from the following expression.

$$T_l = T_r - \{(1 \text{ MW}/100 \text{ kW}) + (1 \text{ MW}/500 \text{ kW}) + R\} = T_o + 8 \text{ sec} - R \quad \text{(Expression 3)}$$

For example, when the time required for switching is 2 seconds, the start-up deadline $T_l$ is set to be 6 seconds later than the command reception timing $T_o$. By determining the start-up deadline in consideration of the response speed of the alternative means such as the power resource 101b, even in a case where the power resource 101a cannot satisfy the command, the alternative means can be made to start up at an appropriate timing, and the possibility of satisfying a requested variation amount increases.

Examples of the alternative means include transmission of a command to the alternative device and a change in target output through a contract change procedure. The change in target output through a contract change procedure refers to, for example, a change in contract condition such as a change in target value (a value of OO W, OO Wh, or the like).

When the power resource 101a succeeds to execute a partial output at a stage where the VPP central control device 103 transmits a command, an output command for a difference and the start-up deadline of the difference can also be notified.

For example, when the power resource 101a generates an output of 4 MW, a difference (here, 10 MW−4 MW=6 MW) and the start-up deadline can be notified using a command transmitted from the VPP central control device 103 to the power resource 101b.

The start-up deadline Tl is determined from the following expression in consideration of the difference.

$$T_l = T_r - (6\ MW/500\ kW/sec) = T_o + 48\ sec \quad \text{(Expression 4)}$$

This represents that, as described above (Expression 2), the output value is 6 MW and the response output speed per second is 500 kW.

In the above description, the power value is the target. However, the description is applicable to a case where the contract target is the amount of power. The start-up deadline $T_l$ can be calculated based on power P that can be generated from the power resource 101 per unit time, a contract amount of power $W_t$ to be output by the power resource 101, and a contract period (in particular, the end timing $T_r$).

$$T_l = T_r - W_t/P \quad \text{(Expression 5)}$$

[1-10. Example of Double Start-Up Preventing Processing]

Next, when a command is transmitted from the VPP central control device 103 to the individual control device 102, a processing of preventing double start-up by the individual control device 102 will be described.

FIG. 9 is a time chart illustrating a state of an example in which a double start-up preventing processing is not executed. In addition, FIG. 10 is a time chart illustrating a state of an example in which the double start-up preventing processing is executed.

In the examples of FIG. 9 and FIG. 10, the upper side is the VPP central control device 103, and the lower side is the individual control device 102 (and the power resource 101 that is controlled by the individual control device 102).

The example of FIG. 9 will be described. First, it is assumed that the VPP central control device 103 transmits an initial start-up command 170 and then the power resource 101 starts up to execute an output 174. After the end of the output 174, the individual control device 102 transmits an acknowledgement 173 to the VPP central control device 103.

Here, as illustrated in FIG. 9, when the acknowledgement 173 is not received by the VPP central control device 103 even after the expiration of a period of a time-out 171, the VPP central control device 103 retransmits a start-up command 172.

The individual control device 102 that receives the retransmitted start-up command 172 executes the start-up command of further increasing power on the power resource 101 such that an output 175 starts to be generated and double start-up occurs. When this double start-up occurs, the power or the amount of power may exceed the upper limit of a predetermined value, and the contract condition is not satisfied, which is not preferable.

Here, in the embodiment, as illustrated in FIG. 10, the individual control device 102 that receives the initial start-up command 170 does not execute the double start-up. That is, in a case where the individual control device 102 executes the output 174 of the power resource 101, even when VPP central control device 103 retransmits the start-up command 172 after the period of the time-out 171, the individual control device 102 does not execute another start-up of the individual control device 101. In this example, the individual control device 102 also transmits the acknowledgement 173 when executing the output 174 of the power resource 101.

In the processing illustrated in FIG. 10, when executing the output 174, the individual control device 102 stores execution information regarding the output and the command identifier 142 in a packet received as the start-up command 170 in association with each other.

FIG. 11 is a flowchart illustrating a control processing including the double start-up preventing processing operation that is executed by the individual control device 102. In the flowchart of FIG. 11, the same processing steps as those of the flowchart of FIG. 8 are represented by the same step numbers as those of FIG. 8.

In FIG. 11, when the current time $T_c$ is earlier than the start-up deadline Tl in the determination of Step S12 (YES in Step S12), the individual control device 102 determines whether or not the corresponding control command is already executed (Step S20). Here, when the control command is not already executed (NO in Step S20), the individual control device 102 controls the power resource (Step S13) and stores the execution information and the command identifier in association with each other (Step S21). As Step S14, the individual control device 102 executes the notification processing of notifying the control result to the VPP central control device 103.

In addition, when the control command is already executed in Step S20 (YES in Step S20), the device proceeds to Step S14. In Step S14, the reception of the stored command identifier, that is, the prevention of double start-up may be included in the notification details to the VPP central control device 103.

In the procedure of FIG. 11, whether or not the control command is executed is determined (Step S20) after the determination on whether or not the start-up deadline is expired (Step S12). However, whether or not the received control command is executed may be determined first, and then when the control command is not executed, whether or not the start-up deadline is expired may be determined. At this time, by allowing the command identifier 142 to include the partial identifier for the partial output divided from the total output, the control command can be more accurately identified.

FIGS. 12 and 13 illustrate examples where a contract power output of 10 MW is divided into five sets of 2 MW and consecutive numbers 1 to 5 as the partial identifiers are assigned to the five sets to distinguish the five sets from each other.

In the examples of FIGS. 12 and 13, the upper side is the VPP central control device 103, and the lower side is the individual control device 102 (and the power resource 101 that is controlled by the individual control device 102). FIG. 12 illustrates the example in which the VPP central control device 103 retransmits the control command 172 after the expiration of the set period of time-out 171. FIG. 13 illustrates the example in which another power resource 101 fails to execute an output in response to the start-up command 170 and another alternative command 176 is transmitted.

In either case, the individual control device 102 corresponding to the power resource 101 receives the two commands 170 and 172 or the two commands 170 and 176.

Here, in the example of FIG. 12, the double start-up is prevented as in the example of FIG. 10. Therefore, when the retransmitted control command 172 is received, the output of the power resource 101 is not executed again.

On the other hand, in the example of FIG. 13, even when the control command 170 and the alternative command 176 have the same output command value of 2 MW, the VPP central control device 103 transmits different partial identifiers. For example, the partial identifier of the control command 170 is "1", and the partial identifier of the alternative command 176 is "2". At this time, since the values of the partial identifiers are different from each other, the individual control device 102 can distinguish the control command 170 and the alternative command 176 from each other. Accordingly, the individual control device 102 can respond to a command for an alternative output, and an output 177 illustrated in FIG. 13 can be executed.

As a result, the reliability of the overall control of the system can be improved.

For the double start-up prevention described above, the individual control device 102 needs to store the command identifier after receiving the control command. When the contract period is determined, this storage period may be within the contract period. Alternatively, a configuration may be adopted in which when the storage capacity of the memory 114 or the non-volatile storage medium 115 of the individual control device 102 has a free space, the storage of the command identifiers is maintained, and when the storage capacity is full, the stored command identifiers are deleted in order from the oldest to the newest. Alternatively, when a request to clear the storage capacity is transmitted from the VPP central control device 103, the individual control device 102 may delete the stored command identifiers.

FIG. 14 is a time chart illustrating an example of a measure against double start-up when alternative start-up of the power resource 101 is executed. In the example of FIG. 14, the upper side is the VPP central control device 103, and the lower side is the individual control device 102 (and the power resource 101 that is controlled by the individual control device 102). This example shows a state where the VPP central control device 103 initially transmits the start-up command 170 to one specific power resource 101a and then transmits the alternative command 176 to another power resource 101b.

In the example of FIG. 14, a state where, when the start-up command 170 is transmitted from the VPP central control device 103 to the specific power resource 101a, the acknowledgement from the power resource 101a cannot be received by the VPP central control device 103 (a state where the output 174 of FIG. 14 cannot be received due to "packet loss") is assumed.

At this time, the VPP central control device 103 cannot determine whether or not a communication abnormality occurs in the control command 170 or in the acknowledgement, and thus cannot determine whether or not the power resource 101a succeeds to execute an output in response to the control command.

In a case where the power resource 101a already executes the output 174 in response to the command 170, when the power resource 101b executes an alternative output 182, the total output of the system may be excessive.

In this case, in order to reduce the possibility of the occurrence of excessive output, for example, a countermeasure of transmitting the control command 170 or an acknowledgement (corresponding to an acknowledgement 181 in FIG. 14) multiple times can be taken to improve the reliability of communication.

Alternatively, as illustrated in FIG. 14, immediately after receiving the control command in the individual control device 102, the individual control device 102 may transmit an acknowledgement 180 indicating that the control command is received to the VPP central control device 103.

Further, the following configuration may be adopted. When the VPP central control device 103 succeeds to receive the acknowledgement 180 of the control command, the control command itself is received by the counterparty side. Therefore, the VPP central control device 103 determines that the power resource 101 is highly likely to start up and does not transmit an alternative command to the power resource 101b.

For example, when an acknowledgement indicating that the control operation is succeeded is received at a probability of a predetermined threshold (for example, 90%) or higher after the reception of the acknowledgement 180 of the control command, it is determined that the success probability of the operation is high. At this time, a configuration in which, even when only the acknowledgement 180 of the control command is received without receiving the acknowledgement 173 within the time-out 171, the alternative command 176 is not transmitted to the power resource 101b can be considered.

Alternatively, the VPP central control device 103 may compare result data of success and failure of output operations after receiving previous receiving responses to each other. At this time, the VPP central control device 103 may store an acknowledgement and reception information of a control command receiving response (for example, the total number of times of reception, the number of times of success of the control operation, communication delay, or the final reception timing) for each of the power resources 101. Whether or not to plan the control command or whether or not to transmit the alternative output is determined based on the stored information. In addition, the control command receiving response may include information indicating the control command receiving response and the command identifier 142 of the corresponding control command.

[1-11. Example of Relationship Between Performance of Power Resource and Start-Up Deadline]

FIGS. 15 and 16 illustrate examples in which the power resource 101 starts up based on an output command transmitted from the VPP central control device 103 to the individual control device 102. In FIGS. 15 and 16, the horizontal axis represents the time, and the vertical axis represents power.

FIG. 15 illustrates the example during a period from an output start to an output stop according to a start-up instruction. FIG. 16 illustrates the example where an output is executed after delayed from the start-up deadline.

In the examples of FIGS. 15 and 16, an output power before the start-up instruction is transmitted is a reference output $P_b$. In the example of FIG. 15, based on the start-up instruction, an output starts to be executed until the start-up deadline $T_l$ and reaches a target output $P_r$ at the request response timing $T_r$. Next, the target output $P_r$ is maintained during an output duration time $T_k$, the output starts to be stopped at an output stop start timing $T_e$, and the output returns to the reference output Pb at an end timing $T_f$.

At this time, the control command transmitted from the VPP central control device 103 to the individual control device 102 may include one or two or more selected from the output duration time $T_r$, the output stop start timing $T_e$, and the end timing $T_f$.

Alternatively, the control command may include the request response timing $T_r$ instead of the start-up deadline $T_l$ such that the individual control device 102 side calculates the state of the power resource and the response time (a period of time from the start-up deadline $T_l$ to the request response timing $T_r$) determined depending on the response speed performance of the output to obtain the start-up deadline $T_l$. In this case, when the command is received in the individual control device 102 after the obtained start-up deadline Tl, the power resource 101 may be controlled.

Alternatively, the command transmitted from the VPP central control device 103 may include designation of the output change speed of the power resource 101.

On the other hand, as illustrated in FIG. 16, when the control command is received after the start-up deadline $T_l$ and the output of the power resource 101 starts, the individual control device 102 notifies insufficient power Dr at the request response timing $T_r$ or estimated power Pa at the request response timing $T_r$ to the VPP central control device 103. Here, the individual control device 102 may notify both the insufficient power $D_r$ and the estimated power $P_a$ to the VPP central control device 103.

The VPP central control device 103 that receives this notification can take a countermeasure of calculating an insufficient output and transmitting an alternative command to another power resource 101.

In addition, in the example of FIG. 15, the output duration time $T_k$ may be "0". Alternatively, the command may include the end timing $T_f$ without including the output stop start timing $T_e$ such that the output stop start timing $T_e$ is calculated based on the output stop speed of the power resource 101 and the stop processing starts at the output start timing $T_e$. Further, the reference output Pb may be "0", may be an output when the control command is received, or may be an output in a steady state.

In the examples of FIGS. 15 and 16, the output power (vertical axis) is used as the command, however the load power consumption may be used as the command. When a control is executed to reduce the output power or the power consumption, the vertical axis illustrated in FIGS. 15 and 16 may be a negative value.

In addition, the packet may not include the start-up deadline $T_l$ and the VPP central control device 103 may transmit the request response timing $T_r$ and another considerable time (for example, a period of time required to transmit an alternative command to another power resource 101).

Further, these parameters may be transmitted from the VPP central control device 103 to the individual control device 102 as different packets. In addition, the power (watt) and the power consumption (watt) have been described as an example. However, the amount of power (watt-hour) and the amount of power consumption (watt-hour) may be used for a command.

In addition, as illustrated in FIG. 17, multiple stages of output changes may be instructed as output commands. Here, as illustrated in FIG. 18, the packet 140 includes multiple start-up deadlines 143 (a start-up deadline 1 and a start-up deadline 2) and multiple output commands 144 (an output command 1 and an output command 2).

FIG. 17 illustrates an example of a power output of the power resource 101 in the above case.

That is, when the individual control device 102 that controls the power resource 101 having the reference power Pb as an output receives the packet 140 illustrated in FIG. 18, an output is started until a start-up deadline $T_l1$ instructed in the start-up deadline 1 to obtain power $P_r1$ instructed in the output command 1 at a request response timing $T_r1$.

Further, an output of increasing power again is started until a start-up deadline $T_l2$ instructed in the start-up deadline 2 to obtain power $P_r2$ instructed in the output command 2 at a request response timing $T_r2$.

Further, in the example of FIG. 17, the power Pre is maintained for a given period $T_k2$, and then output reduction is started until a start-up deadline $T_e2$ instructed in the start-up (stop) deadline to execute a control of returning to the power $P_r1$ instructed in the output command at a request response timing $T_f2$. Further, an output of the power $P_r1$ or higher is maintained for a given period $T_k1$, and then output reduction is started until a start-up deadline $T_e1$ instructed in the start-up (stop) deadline to execute a control of returning to the power $P_b$ instructed in the output command at a request response timing $T_f1$.

The output reduction is executed using the packet 140 illustrated in FIG. 18. Alternatively, a command for increasing an output in multiple stages and a command for decreasing an output in multiple stages may be included in the same packet 140. In this case, the packet 140 includes at least four start-up deadlines and four output commands.

2. Second Embodiment

Hereinafter, a second embodiment of the present invention will be described with reference to FIGS. 19 to 21.

The second embodiment is an example in which the distributed control system according to the present invention is applied to a VPP including the VPP central control device 103 and the individual control device 102, and the overall configuration of the system is, for example, the same as the configuration illustrated in FIG. 1. In addition, the configuration illustrated in FIGS. 2 and 3 is applied as the configuration of the VPP central control device 103, and the configuration illustrated in FIGS. 5 and 6 is applied as the configuration of the individual control device 102.

The second embodiment deals with a case where the individual control device 102 cannot respond to a command from the VPP central control device 103.

[2-1. Control Example of VPP Central Control Device]

FIG. 19 is a flowchart illustrating a control procedure that is executed by the VPP central control device 103 according to the embodiment. In FIG. 19, the same processing steps as those of the flowchart of FIG. 7 described in the first embodiment are represented by the same step numbers.

In the example of FIG. 19, the VPP central control device 103 transmits the control command to the individual control device 102 in Step S5 and then determines whether or not the power resource 101 as a target that receives the control command satisfies the control command (Step S30). The determination of Step S30 is executed by the VPP central control device 103 based on the information included in the response packet from the individual control device 102. Here, when the power resource 101 satisfies the control command (YES in Step S30), the VPP central control device 103 transmits a validation command to the individual control device 102 that controls the corresponding power resource 101 (Step S31).

The upper part of FIG. 21 includes an example of a packet including the validation command. That is, the configuration of the packet to be transmitted by the VPP central control device 103 includes the header 141, the command identifier 142, and a validation command 200. When the individual control device 102 receives the packet including the validation command 200, the individual control device 102 executes a start-up control of the power resource 101 having an output value instructed in the previously received packet (the packet having the configuration illustrated in FIG. 4).

Returning to the description of the flowchart of FIG. 19, when the power resource 101 does not satisfy the control command in Step S30 (NO in Step S30), the VPP central control device 103 returns to the planning of the control command in Step S4. In this case, when the control command is planned, either or both of a case of decreasing an output command value to the corresponding power resource 101 and a case where transmitting an alternative output command to another power resource 101 based on the information (for example, an insufficient output or a truth value indicating whether or not the device can respond to the control command) notified from the individual control device 102 are assumed. When the output command value is decreased, the VPP central control device 103 may select a smaller value than a previous command value among values obtained by equally dividing a rated output value of the power resource 101 by a predetermined number of times of division. Alternatively, the VPP central control device 103 may select the power resource 101 that transmits a command among output value candidates determined depending on an operation mode of the power resource 101. In addition, as the output command value to be transmitted by the VPP central control device 103, a value decreased from the output value of the power resource 101 by a minimum resolution may be selected.

After transmitting the validation command in Step S31, the VPP central control device 103 determines whether or not all the power resources 101 satisfy the command (Step S32), and when all the power resources 101 do not satisfy the command (NO in Step S32), the VPP central control device 103 returns to the planning in Step S4.

In addition, when all the power resources 101 satisfy the command (YES in Step S32), the VPP central control device 103 proceeds to the determination in Step S6.

The upper part of FIG. 21 illustrates the example of the packet including the validation command. However, a packet including an invalidation command may be used. That is, as illustrated in the lower part of FIG. 21, the packet to be transmitted by the VPP central control device 103 may include the header 141, the command identifier 142, and a validation command 201.

[2-2. Control Example of Individual Control Device]

FIG. 20 is a flowchart illustrating a control procedure that is executed by the individual control device 102. In FIG. 20, the same processing steps as those of the flowchart of FIG. 8 described in the first embodiment and to be executed by the individual control device 102 are represented by the same step numbers.

When receiving the packet of the output command in Step S10 (YES in Step S10), the individual control device 102 determines whether or not the command from the VPP central control device 103 is satisfied (Step S40). The determination of Step S40 is executed based on the current state of the power resource 101 and the command details from the VPP central control device 103. For example, when the current output surplus power is a command value or higher, the individual control device 102 determines that the command is satisfied. When the current output surplus power is lower than the command value, the individual control device 102 determines that the command is not satisfied. The individual control device 102 transmits the determination result of whether or not the command is satisfied to the VPP central control device 103 (Step S41). Next, the individual control device 102 extracts the start-up deadline 143 included in the received packet (Step S11). Next, the individual control device 102 determines whether or not a predetermined event (any one of three events including the reception of the output command, the reception of the validation command, and the expiration of the start-up deadline) occurs (Step S42). When the predetermined event does not occur (No in Step S42), the device waits.

When the output command is already received at the time of the determination of Step S10 (NO in Step S10), the individual control device 102 proceeds to the determination of Step S43. Here, the individual control device 102 determines whether or not the validation command is received (Step S43). When the validation command is received (YES in Step S43), the individual control device 102 controls the power resource 101 instructed in the output command determined in Step S10 (Step S13), notifies the control result to the VPP central control device 103 (Step S14), and ends the control.

In addition, when the validation command is not received in Step S43 (NO in Step S43), in Step S14, the individual control device 102 notifies the control result regarding the deadline expiration to the VPP central control device 103 and ends the process without controlling the power resource 101.

In Step S43, even when the individual control device 102 transmits the invalidation command illustrated in the lower part of FIG. 21 instead of the validation command, the individual control device 102 notifies the control result of the power resource 101 to the VPP central control device 103 and ends the process without controlling the power resource 101 (Step S14).

In addition, even when the individual control device 102 receives the validation command or the invalidation command without receiving the start-up deadline, the individual control device 102 may notify the non-reception of the start-up deadline to the VPP central control device 103.

In Step S42, when two or more of the three events including the reception of the output command, the reception of the validation command, and the expiration of the start-up deadline occur at the same time, the priority may be random. For example, by giving priority to the expiration of the start-up deadline, the reception of the output command and/or the reception of the validation command may be negligible. Alternatively, when priority is given to the reception of the output command, the start-up deadline may be updated by the output command. Therefore, the expiration of the start-up deadline may be negligible. Alternatively, by giving priority to the reception of the validation command, the power resource 101 may be controlled.

By controlling the VPP central control device 103 and the individual control device 102 as described above, for example, even when the power resource 101 cannot satisfy the command of the VPP central control device 103 unlike a previously estimated state, the command can be planned again to satisfy the condition. In addition, even when a communication abnormality occurs, the entire VPP system can be controlled while securing high reliability using the start-up deadline, the validation command, and the invalidation command.

3. Third Embodiment

Hereinafter, a third embodiment of the present invention will be described with reference to FIGS. 22 and 23.

The third embodiment is an example in which the distributed control system according to the present invention is applied to a VPP including the VPP central control device 103 and the individual control device 102, and for example, the configuration illustrated in FIG. 1 is applied as the overall configuration of the system. In addition, the configuration illustrated in FIGS. 2 and 3 is applied as the configuration of the VPP central control device 103, and the configuration illustrated in FIGS. 5 and 6 is applied as the configuration of the individual control device 102.

[3-1. Control Example of VPP Central Control Device]

FIG. 22 is a flowchart illustrating a control procedure that is executed by the VPP central control device 103 according to the embodiment. In FIG. 22, the same processing steps as those of the flowchart of FIG. 7 described in the first embodiment and to be executed by the VPP central control device 103 are represented by the same step numbers.

First, the VPP central control device 103 concludes a contract on a transaction relating to power generation or load reduction (Step S1), acquires the information of the power resource (Step S2), waits until the command timing (Step S3), and plans the control command (Step S4). The VPP central control device 103 transmits the control command (Step S5).

Here, the command value included in the control command may be a total output of all the power resources 101 or a command of an output divided by a plan. The start-up deadline 143 (FIG. 4) of the packet 140 is calculated based on the request response timing $T_r$ and the time R for switching to another alternative command for another power resource. At this time, the switching time R includes a mediation time $T_a$ between the power resources 101 described below.

Accordingly, the start-up deadline $T_r$ is obtained from the following Expression.

$$T_r = T_r - (T_u i + R) \quad \text{(Expression 6)}$$

$$R = T_u j + T_n + T_a \quad \text{(Expression 7)}$$

Here, $T_u i$ and $T_u j$ represent output response times of a power resource $101i$ and a power resource $101j$, respectively, which are, for example, values obtained by dividing a required output (for example, 1 MW) by an output response speed (for example 100 kW/sec). $T_n$ represents communication delay for switching to the alternative power resource 101.

The mediation time $T_a$ refers to, for example, a time required for all the individual control devices 102 to execute a processing in which each of the individual control devices 102 transmits broadcast communication to the other individual control devices 102 once. A mediation algorithm used in this case includes a method in which the details to be transmitted by each of the individual control devices 102 includes a priority index such as a power generation cost, and each of the individual control devices 102 compares its own index to the index of another individual control device 102 to determine whether or not the individual control device 102 becomes an alternative. The priority index is the same as an index in a planning algorithm of the VPP central control device 103. Examples the method of determining whether or not the individual control device 102 becomes an alternative include a method of selecting the individual control device 102 in which the index value is the maximum.

Returning to the description of the flowchart of FIG. 22, after transmitting the control command obtained as described in Step S5, the VPP central control device 103 determines whether or not the control result is received from the individual control device 102 (Step S50). Here, when the control result is not received (NO in Step S50), the device waits until the control result is received. When the control result is received (YES in Step S50), the device proceeds to the determination of Step S6.

[3-3. Control Example of Individual Control Device]

FIG. 23 is a flowchart illustrating a control procedure that is executed by the individual control device 102 according to the embodiment. In FIG. 23, the same processing steps as those of the flowchart of FIG. 8 described in the first embodiment and to be executed by the individual control device 102 are represented by the same step numbers.

First, the individual control device 102 determines whether or not the a command is received from the VPP central control device 103 (Step S10). Here, when the command is received (YES in Step S10), the individual control device 102 determines whether or not the command details can be satisfied (Step S40). Here, when it is determined that the command details can be satisfied (YES in Step S40), the individual control device 102 that receives the command attempts to mediate with the other individual control devices 102 (Step S60). When the individual control device 102 is selected as a result of the mediation (YES in Step S61), the individual control device 102 extracts the start-up deadline included in the received command (Step S11). Next, whether or not the current time is earlier than the extracted start-up deadline is determined (Step S12). When the current time is earlier than the start-up deadline (YES in Step S12), the individual control device 102 controls the power resource 101 according to the command details (Step S13), and expands the control result (Step S62). Here, for example, the individual control device 102 expands the power resource 101 and the individual control device 102 that execute an output, the amount of the output, and the mediation details to the VPP central control device 103 and the other individual control device 102.

In addition, when the current time is not earlier than the start-up deadline in Step S12 (NO in Step S12), the device proceeds to Step S62.

After expanding the control result, whether or not all the controls end is determined (Step S63). When all the controls end (YES in Step S63), the individual control device 102 transmits the control result to the VPP central control device 103 (Step S64) and ends the processing.

In addition, when it is determined that the command details cannot be satisfied in Step S40 (NO in Step S40), and when the individual control device 102 is not selected in Step S61 (NO in Step S61), the individual control device 102 ends the processing.

Further, when a control that does not end is present in Step S63, the individual control device 102 returns to the determination of Step S10.

The determination of whether or not the command is satisfied in Step S40 is executed in consideration of the performance and current state of the power resource 101. For example, when the current output surplus power is a command value or higher, the individual control device 102 determines that the command is satisfied. When the current output surplus power is lower than the command value, the individual control device 102 determines that the command is not satisfied. In addition, a target to be determined may be all the outputs in the command or a part thereof.

In addition, the mediation of Step S60 refers to exchanging information between the respective individual control device 102 to determine the individual control device 102 that generates power and the amount of power generated by the individual control device 102. At this time, the information to be exchanged includes information (for example, the kind, output performance, a rated value, or an operation result) relating to each of the individual control devices 102 and the power resource 101, a desired output value, and information (for example, a power generation cost, a response speed, or the magnitude of surplus power) of evaluation indices used for the mediation.

As a result of the mediation, one individual control device 102 may execute the total command output, and the output may be divided by the multiple power resources 101. When the output is shared by the multiple power resources 101, the divided outputs can be calculated using the above-described index values. Here, the calculation of the divided outputs refers to, for example, distribution in proportion to the index values, distribution in inverse proportion to the index values, or equal distribution.

Regarding a mediation method, one or multiple power resources 101 are selected by comparing the index values. For example, the power resources 101 having the maximum and minimum index values can be selected. Alternatively, a method of exchanging the multiple index values, giving priorities to the index values, and comparing the index values to each other in order of the priorities can be adopted. For example, a method of exchanging three indices including the power generation cost, the response speed, and the identifier of the power resource 101 and comparing the indices in this order can be adopted. At this time, by surely determining the identifiers of the power resources 101 to be unique from each other, even when the index values of the power generation cost and the response speed are the same, one power resource 101 can be surely selected according to the order of the identifiers (the alphabetical order or the order of the size of number).

When the multiple power resources 101 are selected, a method of selecting the power resource 101 that satisfies a specific condition can be adopted. For example, a method of selecting the power resource 101 in which the current surplus power is higher than or equal to a predetermined threshold or the power resource 101 in which the response speed is higher than or equal to a predetermined threshold and the output surplus power is higher than or equal to a predetermined threshold can be adopted. The information (for example, the mediation method or the index value of the individual control device 102) relating to the mediation is stored in, for example, the setting storage unit 161 of the individual control device 102.

In addition, regarding the expansion of the result in Step S62, when all the outputs in the command are not executed (that is, in the case of the partial output), the difference as a new command value may be expanded to all the power resources 101. Further, the processing of expanding the result in Step S62 may be executed by the VPP central control device 103 instead of the individual control device 102.

For communication for executing the mediation in Step S60 of the flowchart of FIG. 23, a communication method of transmitting a packet to a plurality of transmission destinations, for example, broadcast or multicast can be adopted.

Alternatively, a packet may be sequentially transmitted to the respective individual control devices 102 based on a predetermined order. The individual control device 102 that receives the packet at the time of the mediation subtracts its own executable output from the received command, and transmits the difference to the next power resource (individual control device 102). This way, the packet can be sequentially transmitted.

For example, the initial individual control device 102 outputs 2 MW in the command value of 10 MW and transmits the difference of 8 MW to the next individual control device 102. When the entire command value is satisfied, the result is expanded to the VPP central control device 103 and the other individual control device 102. Alternatively, when the start-up deadline in the packet is expired, the result is also expanded to the VPP central control device 103 and the other individual control device 102.

Alternatively, the command transmitted from the VPP central control device 103 may include a condition of the power resource 101 that execute an output in the packet. Examples of the condition include a power generation cost that is higher than or equal to a desired value.

The communication order may be stored in the VPP central control device 103 or the individual control device 102 as a list, or simply, the VPP central control device 103 or each of the individual control device 102 may store the information of the next individual control device 102 to which the command is to be transmitted. The order list may be regularly updated, or the VPP central control device 103 may expand the order list when the command is transmitted. Alternatively, the order list may be expanded when the evaluation indices of the plan in the VPP central control device 103 change. In addition, the order of the list may be the order of the evaluation indices of the plan in the VPP central control device 103. In addition, the order may change under a predetermined condition during the transmission of the command. For example, the initial order is the order of the power generation cost, and when a period of time until the start-up deadline is shorter than or equal to a predetermined threshold, the order may change to the order of the response speed.

Alternatively, a connection between the VPP central control device 103 and each of the individual control devices 102 constituting the communication network 104 may be a ring-type network that sequentially connect the respective devices.

FIG. 24 illustrates an example of a ring-type communication network that sequentially connect the VPP central control device 103 and each of the individual control devices 102. As illustrated in FIG. 24, the ring-type network connects the VPP central control device 103 and each of the individual control device 102 to each other in a ring shape. As this network, for example, IEC 61784 standard or IEC 62439-3 standard can be applied.

Alternatively, the individual control device 102 may monitor the network and may interrupt its own control operation when verifying that another command packet having the command identifier 142 received by the individual control device 102 is communicated. This case may occur when a communication abnormality occurs in the command from the VPP central control device 103 to the individual control device 102, when a device abnormality occurs in the power resource 101, or when a communication abnormality occurs in the acknowledgement from the individual control device 102 to the VPP central control device 103. When this abnormality occurs, the VPP central control device 103 retransmits the command having the same command identifier 142 to the group of the individual control devices 102 after the expiration of the time-out. Here, since the VPP central control device 103 retransmits the alternative command, the individual control device 102 that receives the initial control command can interrupt the control operation even when being processing the corresponding command.

In the distributed control system according to the third embodiment described above, the individual control device 102 can autonomously process the command from the VPP central control device 103. As a result, the VPP central control device 103 does not need to manage the state of the individual control device 102 in detail, and can reduce the degree of coupling between the VPP central control device 103 and the individual control device 102. Therefore, the system can be flexibly constructed. Further, the VPP central control device 103, the power resource 101, or the individual control device 102 can be easily changed, added, or deleted. Therefore, the system construction cost or the operation cost of the VPP can be reduced. In addition, since the function of the VPP central control device 103 is simple, the implement cost of the VPP central control device 103 can be reduced.

4. Another Example of Communication Network

In each of the embodiments described above, as illustrated in FIG. 1, the communication network 104 executes direct communication between the VPP central control device 103 and the individual control device 102. On the other hand, an intermediate device that interrupts the packet may be provided halfway the communication network 104.

FIG. 25 illustrates a configuration example in which an intermediate device 210 is provided halfway the communication network 104 that executes communication between the VPP central control device 103 and the individual control device 102 (or between the individual control devices 102).

The intermediate device 210 may convert and transmit the start-up deadline and the command output in the command from the VPP central control device 103 to the lower-level individual control device 102.

In addition, the intermediate device 210 may change the switching time R of (Expression 3) in consideration of delay to each of the individual control devices 102 to change the start-up deadline for each the lower-level individual control device 102. For example, by configuring the intermediate device 210 to determine whether or not to transmit the alternative command, the communication delay of the alternative command to the lower-level individual control device 102 is reduced, and thus the switching time R of (Expression 3) can be reduced. As a result, the start-up deadline can be delayed, the number of times of communication with the power resource 101 can be increased, and the reliability of execution of the VPP system can be further improved. Further, a processing load on the VPP central control device 103 can be reduced, and thus the VPP central control device 103 can be constructed at a low cost.

By providing the intermediate device 210 as described above, the amount of communication corresponding to the communication network 104 can be appropriately adjusted (for example, the amount of communication can be reduced). Alternatively, the intermediate device 210 can monitor the state of the individual control device 102 at all times such that a more practical start-up deadline can be calculated. For example, after transmitting the command, when the state of the power resource 101 changes, when the surplus power increases, or when the response speed or the power generation cost changes, the VPP central control device 103 can calculate a more practical start-up deadline. When the state of the power resource 101 frequently changes such that communication delay between the individual control device 102 and the VPP central control device 103 is large, the VPP system can be constructed with higher reliability by using the intermediate device 210.

Alternatively, the intermediate device 210 may divide the output value to change the command identifier 142. In a change method, when the original VPP central control device 103 or the intermediate device 210 is configured hierarchically, a command identifier 142a transmitted from the higher-level intermediate device 210 and a command identifier 142a newly generated from intermediate device 210 may be added. Alternatively, the command identifier 142a and the command identifier 142b may be recorded in the intermediate device 210 in association with each other such that only the command identifier 142b is added to the packet.

By providing the intermediate device as described above, a processing load on the VPP central control device 103 can be reduced. In addition, the amount of communication suitable for the lower-level communication network 104 can be changed. Further, delay required for the alternative output can be reduced and the start-up deadline can be delayed such that the number of trials for the communication command can be increased. Accordingly, a flexible configuration of the control system of the VPP, a low-cost system construction, and an effect of improving the reliability can be obtained.

5. Example Applied to Production Line

Here, each of the embodiments is the example in which the distributed control system according to the present invention is applied to the VPP that controls the power resource 101. On the other hand, each of the embodiments of the present invention may be applied to various other distributed control systems.

FIG. 26 is an example in which the distributed control system according to the present invention is applied to a production line.

In FIG. 26, a production planning device 220 corresponding to the central control device and an individual production line 221 corresponding to the individual control device are connected to each other via the communication network 104. FIG. 26 illustrates an example in which the production lines 221 in one factory are connected. However, the production lines 221 in a plurality of factories may be connected. That is, the production planning device 220 may control a plurality of factories. Alternatively, the production planning device 220 may control a plurality of production facilities in one production line.

The production planning device 220 makes a production plan in a factory and transmits a production command to the production line. Examples of the production planning device 220 include SCADA (Supervisory Control And Data Acquisition) and DCS (Distributed Control System).

The production planning device 220 transmits a packet including an operation start deadline and a production command to the production line 221. This production command is associated with the output command described in each of the embodiments.

This configuration can deal with a case where the production planning device 220 transmits the production command to each of the production lines 221 and the production line 221 cannot execute production as planned or a case where the production planning device 22 cannot respond to the production command due to an abnormality relating to the communication of the production command.

6. Example Applied to Autonomous Traveling

In addition, the distributed control system according to each of the embodiments of the present invention may be applied to a distributed control system that controls autonomous traveling of an automobile (vehicle).

FIG. 27 illustrates a state where a plurality of autonomous vehicles 230a, 230b, . . . and 230e that are traveling communicate with each other via the communication network 104. In this example, one autonomous vehicle 230e travels on an overtaking lane (a right lane in FIG. 27), and the other autonomous vehicles 230a to 230d travel on a driving lane (a left lane in FIG. 27). Although not illustrated in FIG. 27, a traveling control device mounted on each of the autonomous vehicles 230a to 230e functions as the individual control device, and a device (for example, a control center) that controls the traveling of all the vehicles on a road functions as the central control device. The control device mounted on any one vehicle may function as the central control device.

Here, for example, it is assumed that one autonomous vehicle 230c that is traveling on the driving lane attempts to change the lane to the overtaking lane. The vehicles other than the autonomous vehicle 230c may be vehicles that are not autonomously traveling (that is, vehicles that are driven by drivers).

Under the above-described circumstances, the central control device notifies the control command and the start-up deadline to each of the vehicles 230a to 230e. For example, FIG. 27 illustrates a case where an overtaking command is transmitted to the autonomous vehicle 230c.

Here, in a case where a communication abnormality occurs in the overtaking command or in a case where there is a limit on the overtaking ability of the vehicle (for example, a reserve for speed or the remaining amount of gasoline), the autonomous vehicle 230e as a following vehicle has the possibility of collision. Therefore, in order to secure an appropriate distance from the autonomous vehicle 230e and to safely overtake the autonomous vehicle 230e, the packet may include a deadline by which the autonomous vehicle 230c starts to overtake the autonomous vehicle 230e.

The start-up deadline is determined based on information of the autonomous vehicle 230c, information of the autonomous vehicle 230e, a safe inter-vehicular distance to be secured during overtaking, a current inter-vehicular distance between the autonomous vehicles 230c and 230e, and a switching time required to change the lane.

Here, a timing $T_r$ (that is, the request response timing) at which a rear end of the autonomous vehicle 230c and a front end of the autonomous vehicle 230e are aligned is obtained from the following expression.

$$T_r = T_c + L_c/(V_e - V_c) \quad \text{(Expression 8)}$$

Here, $T_c$ represents the current time, $L_c$ represents a current inter-vehicular distance between the autonomous vehicles 230c and 230e, $V_e$ represents the speed of the autonomous vehicle 230e, and $V_c$ represents the speed of the autonomous vehicle 230c.

Accordingly, the start-up deadline Tl is obtained from the following Expression.

$$T_l = T_r - \{L_s/(V_e - V_c) + R\} = T_c + (L_c - L_s)/(V_e - V_c) - R \quad \text{(Expression 9)}$$

Here, $L_s$ represents the safe inter-vehicular distance.

After the autonomous vehicle 230e passes the autonomous vehicle 230c, the autonomous vehicle 230c can safely change the lane again.

This control can be executed by adding the control restart timing to the packet.

FIG. 28 illustrates a configuration example of the packet 140 in the above case. In the packet 140 illustrated in FIG. 28, a control restart timing 240 may be arranged in addition to the header 141, the command identifier 142, the start-up deadline 143, and the output command 144

The control restart timing 240 is available in a state where the autonomous vehicle 230e advances from the autonomous vehicle 230c by the safe inter-vehicular distance Ls. Therefore, the control restart timing $T_b$ is obtained from the following expression.

$$T_b = T_r + (B_e + B_e + L_s)/(V_e - V_c) \quad \text{(Expression 10)}$$

Here, $T_r$ represents the timing at which the rear end of the autonomous vehicle 230c and the front end of the autonomous vehicle 230e are aligned, $B_c$ represents the length of a vehicle body of the autonomous vehicle 230c in the lane direction, and $B_e$ represents the length of a vehicle body of the autonomous vehicle 230c in the lane direction.

When a plurality of vehicles other than the autonomous vehicle 230e travel on the overtaking lane, the start-up deadline or the restart timing may be calculated in consideration of information of the vehicles.

The start-up deadline may be calculated with respect to the first vehicle that travels on the overtaking lane, and the restart timing may be calculated with respect to the final vehicle that travels on the overtaking lane.

In addition, using the partial identifiers described above, in the embodiments, for example, the autonomous vehicles 230a to 230d that travel on the driving lane illustrated in FIG. 27 may be distinguished from each other.

In addition, here, the overtaking of the autonomous vehicle has been described as an example. However, the present invention is applicable not only to overtaking operation but also to various kinds of autonomous traveling and a group control thereof. In addition, the present invention is applicable not only to a group control of automobiles but also to a distributed control system between ECUs (Engine Control Unit) in control systems of vehicles.

7. Other Modification Examples

Further, the present invention is applicable to control systems other than the power control system, the control system of the production line, and the control system of vehicles such as autonomous vehicles described above. For example, the present invention may be applied to a group control or autonomous control of flying objects such as drones or to a distributed control system of moving objects such as construction machines or airplanes.

In addition, the present invention is not limited to the embodiments and includes various modification examples. For example, the embodiments have been described in detail in order to easily describe the present invention, and the present invention is not necessarily to include all the configurations described above. In addition, a part of the configuration of one embodiment can be replaced with the configuration of another embodiment or a modification example. Further the configuration of one embodiment can be replaced with the configuration of another embodiment or a modification example. In addition, addition, deletion, and replacement of another configuration can be made for a part of the configuration of each of the embodiments.

In addition, some or all of the above-described respective configurations, functions, processing units, processing means, and the like may be realized by hardware, for example, by designing an integrated circuit. In addition, the respective configurations, functions, and the like may be realized by software by a processor interpreting and executing a program that realizes each of the functions. Information of a program, a table, a file, or the like that realizes each of the functions can be stored in a recording device such as a memory, a hard disk, or an SSD (Solid State Drive) or a recording medium such as an IC card, an SD card, or a DVD.

In addition, the drawings illustrate control lines or information lines as considered necessary for explanations but do not illustrate all control lines or information lines in the products. It can be considered that almost of all components are actually interconnected.

REFERENCE SIGNS LIST

100: power system
101: power resource
102: individual control device
103: VPP central control device
104: communication network
111: CPU (central control unit)
112: communication controller
113: physical layer processor
114: memory
115: non-volatile storage medium
116: bus
130: VPP controller
131: power resource information storage unit
132: start-up deadline determination unit
133: communication unit
134: timing synchronization controller
140: packet
141: header
142: command identifier
143: start-up deadline
144: output command
150: input/output unit
160: power resource controller
161: setting storage unit
170: start-up command
171: time-out
172: retransmission
173, 181: acknowledgement
174, 175, 177, 182: output
176: alternative command
180: control command receiving response
200: validation command
201: invalidation command
210: intermediate device
220: production planning device
221: production line
230: autonomous vehicle
240: control restart timing

The invention claimed is:

1. A communication method, comprising:
communicating a packet that includes a predetermined portion of a command for instructing control of a device to be controlled, first identification information identifying the predetermined portion of the command, and a start-up deadline of the command, and second identification information in a header of the packet identifying the device to be controlled as a destination of the packet,
wherein the predetermined portion of the command for instructing control of the device to be controlled is one of a plurality of portions of the command.

2. The communication method according to claim 1, wherein
the communication method is applied to a distributed control system in which the packet including the command is transmitted from a central control device to an individual control device such that the individual control device controls a device to be controlled, the communication method further comprising:
start-up deadline determination processing for setting a start-up deadline in consideration of the performance of the device to be controlled; and
communication processing for transmitting the packet from the central control device to the individual control device.

3. The communication method according to claim 2, wherein
in the start-up deadline determination processing, the start-up deadline is determined based on a start timing or an end timing at which the device to be controlled is controlled and the performance of the device to be controlled.

4. The communication method according to claim 2, wherein
in the start-up deadline determination processing, the start-up deadline is advanced from a start timing or an end timing at which the device to be controlled is controlled by a period of time required to start or stop the device to be controlled.

5. The communication method according to claim 2, wherein
in the start-up deadline determination processing, the start-up deadline is advanced from a start timing or an end timing at which the device to be controlled is controlled by a period of time required to execute a processing in an alternative device.

6. The communication method according to claim 5, wherein
the alternative device starts or stops an alternative device of the device to be controlled or changes control conditions.

7. The communication method according to claim 2, wherein
in the communication processing, the command included in the packet that is transmitted by the central control device includes a validation command for controlling the device to be controlled.

8. The communication method according to claim 2, wherein
in the communication processing, the command included in the packet that is transmitted by the central control device includes control restart timing information for instructing to restart controlling the device to be controlled.

9. The communication method according to claim 1, wherein
the device to be controlled is a power generation device or a loading device.

10. A central control device that is connected to an individual control device via a network and is applied to a distributed control system in which a packet including a command for instructing a control is transmitted from the central control device to the individual control device such that the individual control device controls a device to be controlled, the central control device comprising:
a communication unit that transmits a packet that includes a predetermined portion of a command for instructing control of a device to be controlled, first identification information identifying the predetermined portion of the command, and a start-up deadline of the command to the individual control device, and second identification information in a header of the packet identifying the device to be controlled as a destination of the packet, wherein the predetermined portion of the command for instructing control of the device to be controlled is one of a plurality of portions of the command.

11. An individual control device that is connected to a central control device via a network and is applied to a distributed control system in which the individual control device receives a packet including a command for instructing a control transmitted from the central control device so as to control a device to be controlled, the individual control device comprising:

a communication unit that receives the packet transmitted from the central control device; and a controller that extracts the command and a start-up deadline included in the packet received by the communication unit, controls the device to be controlled based on the extracted command when a current time is earlier than the start-up deadline, and does not control the device to be controlled based on the extracted command when the current time is later than the start-up deadline.

12. The individual control device according to claim 11, wherein the packet to be transmitted from the central control device includes an identifier of the command, and the controller of the individual control device does not control the device to be controlled based on the extracted command when detecting the same command identifier as the identifier of the command extracted from the previously received packet.

13. The individual control device according to claim 11, wherein the controller of the individual control device determines whether or not the command is executable in consideration of a state of the device to be controlled, and controls the device to be controlled based on a result of a mediation with another individual control device when determining that the command is executable.

* * * * *